(12) United States Patent
Sugawara

(10) Patent No.: US 10,893,165 B2
(45) Date of Patent: Jan. 12, 2021

(54) INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Kazuhiro Sugawara, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/128,878

(22) Filed: Sep. 12, 2018

(65) Prior Publication Data
US 2019/0089862 A1    Mar. 21, 2019

(30) Foreign Application Priority Data

Sep. 15, 2017 (JP) .................................. 2017-178047

(51) Int. Cl.
| | |
|---|---|
| *H04N 1/32* | (2006.01) |
| *G06F 3/06* | (2006.01) |
| *H04N 1/00* | (2006.01) |

(52) U.S. Cl.
CPC ....... *H04N 1/32128* (2013.01); *G06F 3/0638* (2013.01); *H04N 1/00212* (2013.01); *H04N 1/00217* (2013.01)

(58) Field of Classification Search
CPC ........................ H04N 1/32128; G06F 3/0638
See application file for complete search history.

(56) References Cited

U.S. PATENT DOCUMENTS

| | | | |
|---|---|---|---|
| 7,676,116 B2* | 3/2010 | Tamai ................ | H04N 1/00127 358/403 |
| 8,639,063 B2 | 1/2014 | Tamai et al. | |
| 2005/0083416 A1* | 4/2005 | Jeon ........................ | H04N 5/772 348/231.3 |
| 2005/0147091 A1* | 7/2005 | Momozono ....... | H04L 29/12301 370/356 |
| 2006/0004867 A1 | 1/2006 | Tamai et al. | |
| 2010/0149602 A1 | 6/2010 | Tamai et al. | |
| 2012/0154853 A1* | 6/2012 | Otake ...................... | H04N 1/41 358/1.15 |
| 2013/0169985 A1* | 7/2013 | Inomata ................ | G06F 21/608 358/1.13 |

FOREIGN PATENT DOCUMENTS

JP          2005322971 A       11/2005

\* cited by examiner

*Primary Examiner* — Ibrahim Siddo
(74) *Attorney, Agent, or Firm* — Venable LLP

(57) ABSTRACT

The present invention discloses an image processing apparatus having a scanner that scans an original document. The image processing apparatus generates image data after the scanner scans the original document, converts the generated image data into a file, sets a file name of the file, performs a transmitting process for transmitting the file with the set file name, registers an operation object for transmitting the file, in association with a name of the registered operation object, and causes a display to display the registered operation object. When the file is to be transmitted according to an operation of the displayed operation object, image forming apparatus refers to the name of the operation object and sets a file name using the name in the file.

40 Claims, 22 Drawing Sheets

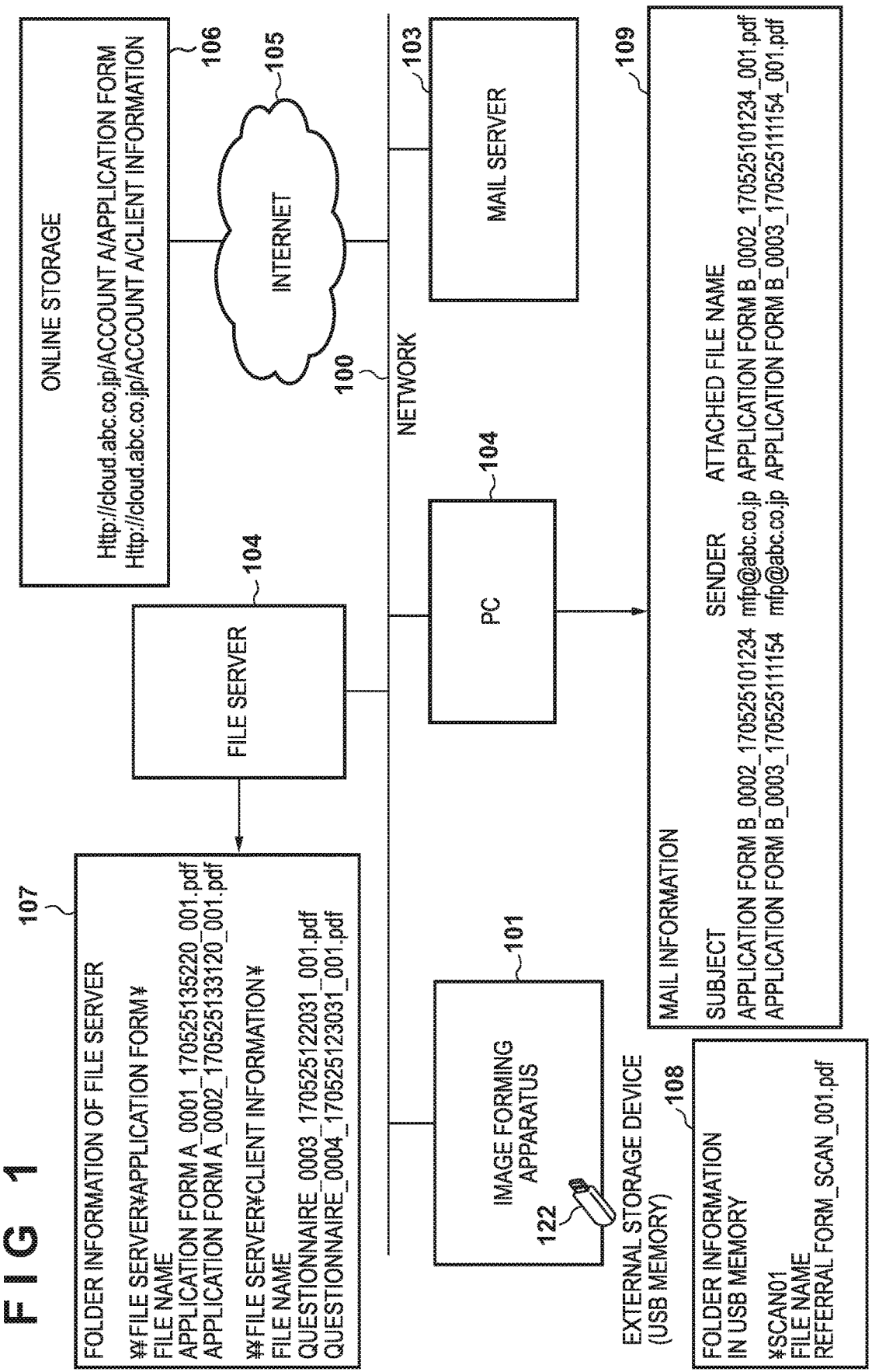

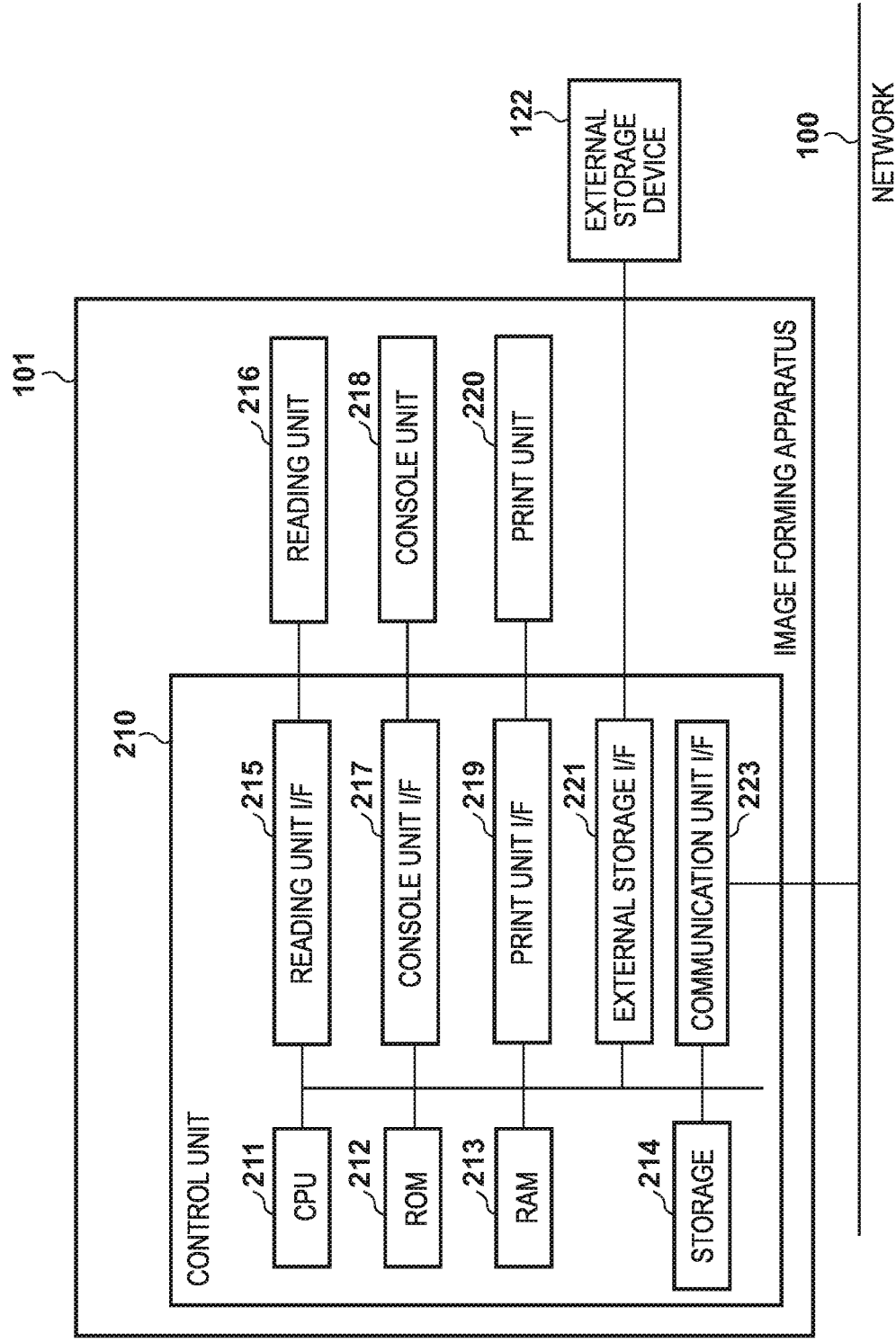

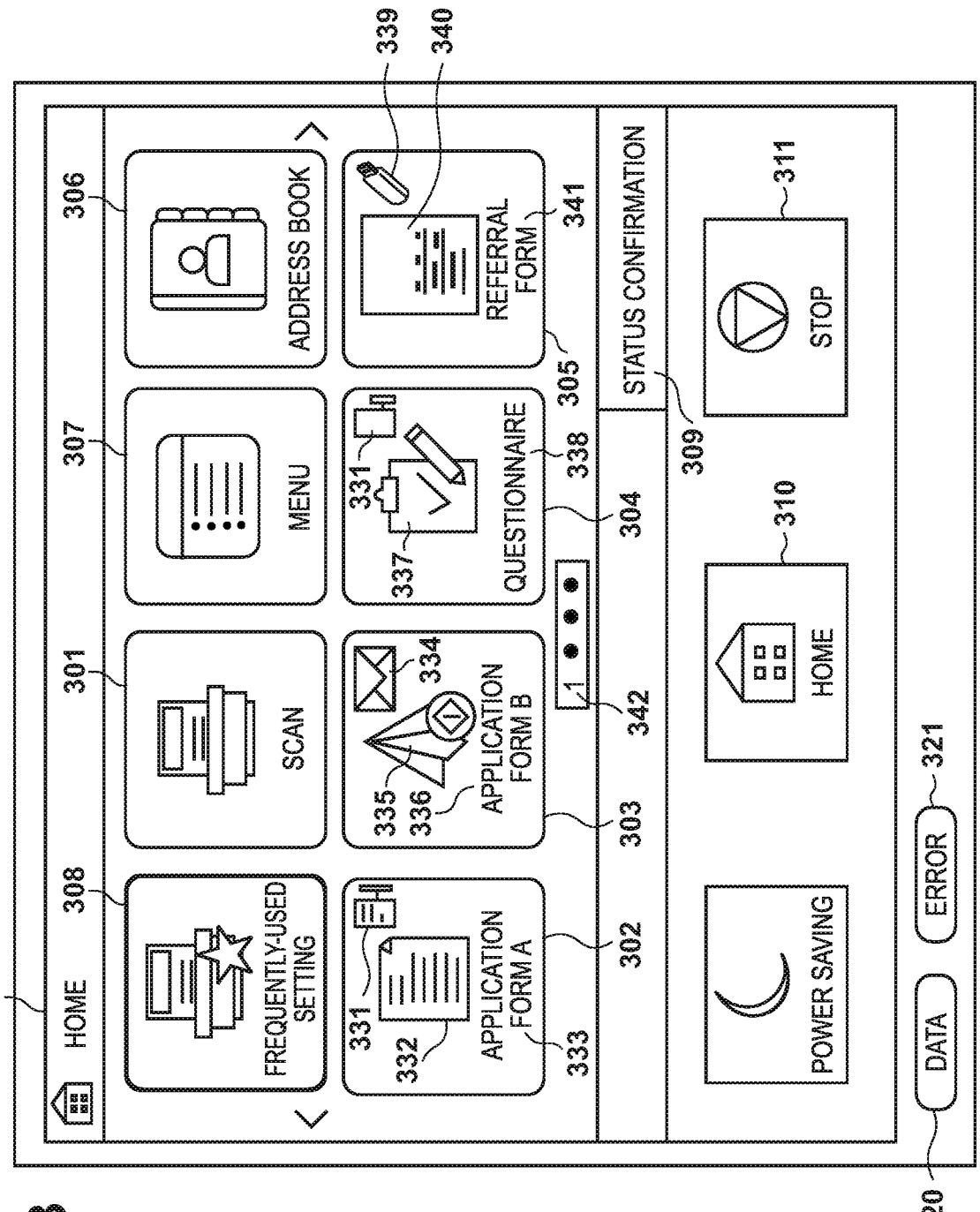

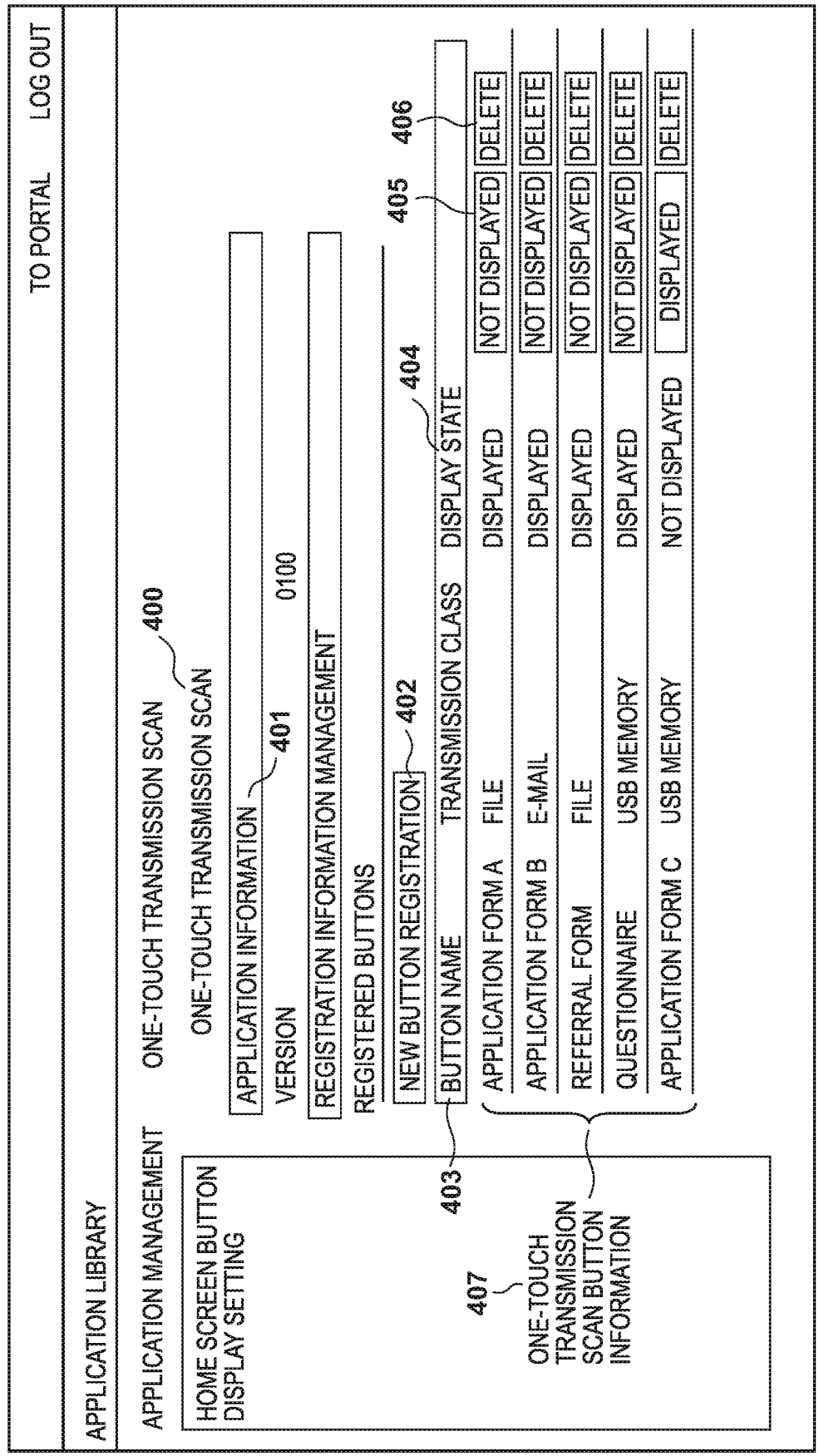

FIG 5

| | TO PORTAL | LOG OUT |
|---|---|---|

APPLICATION LIBRARY

APPLICATION MANAGEMENT   ONE-TOUCH TRANSMISSION SCAN > DETAILED BUTTON INFORMATION > BUTTON EDITING

HOME SCREEN BUTTON DISPLAY SETTING

BUTTON EDITING                                4100 — OK | CANCEL

DETAILED BUTTON INFORMATION

BASIC SETTING
BUTTON NAME:   [APPLICATION FORM A] — 4102      4101
4113 — ☑ DISPLAY CONFIRMATION SCREEN BEFORE EXECUTION

FILE NAME:   [BUTTON NAME ▼]   [ABC]
4103 — [AUTOMATIC]               4104   4120
       [CHARACTER STRING]

4127 — ICON
       4126    340   [337] [332] [4124] [335]
       [ICON ADD/DELETE]

TRANSMISSION TYPE:   4107 — [FILE ▼]   [SWITCH] — 4108
4109                         [E-MAIL]
                             [USB MEMORY]

TRANSMISSION SETTING  FILE)                  4110      4111

TRANSMISSION DESTINATION: [\\FILE SERVER\APPLICATION FORM] [SELECT FROM ADDRESS BOOK]

☑ STORE IN FOLDER WITH BUTTON NAME ▼
4114 ☐ STORE BUTTON NAME IN FILE ATTRIBUTE   4116 — [TITLE ▼]
     4115                                            [COMMENT]
                                                    [KEYWORD]

SETTING MENU SWITCHES FOR EACH TRANSMISSION CLASS

SCANNING SIZE:   [A4 ▼]
COLOR MODE:      [COLOR ▼]
FILE FORMAT:     [PDF OCR) ▼] — 4112
  ENCRYPTED PDF:   [Acrobat 10.0 PERSON/256-bit AES ▼]
  ☐ SET/CHANGE PASSWORD
  PASSWORD:
  CONFIRMATION INPUT:
  ELECTRONIC SIGNATURE   [NONE ▼]
  ☐ DIVIDE INTO PAGES
DENSITY:                          [0 ▼]
ORIENTATION OF ORIGINAL DOCUMENT: [PORTRAIT ▼]
TYPE OF ORIGINAL DOCUMENT:        [TEXT/PHOTOGRAPH ▼]
DOUBLE-SIDED ORIGINAL DOCUMENT:   [LEFT-RIGHT OPENING ▼]
SHARPNESS:                        [0 ▼]
DATA SIZE:                        [LARGE: PRIORITIZE IMAGE QUALITY ▼]

FIG. 6

APPLICATION LIBRARY | TO PORTAL   LOG OUT

APPLICATION MANAGEMENT

ONE-TOUCH TRANSMISSION SCAN > DETAILED INFORMATION
> BUTTON SELECTION > SELECT FROM ADDRESS BOOK

HOME SCREEN BUTTON
DISPLAY SETTING — 4304

SELECT FROM ADDRESS BOOK
SELECT AN ADDRESS FROM THE ADDRESS BOOK AND CLICK [OK]

4300  4301
[OK] [CANCEL]

FILE SELECTION — 4305

ADDRESS BOOK

TYPE: [BEST MEMBER ▼] [DISPLAY SWITCH] — 4303
BEST MEMBER                    4302

| SELECTION | NUMBER | TYPE | NAME | DESTINATION |
|---|---|---|---|---|
| ○ | 01 | ✉ | email_a | email_a@abc.co.jp |
| ○ | 02 | ✉ | email_b | email_b@abc.co.jp |
| ○ | 03 | 📠 | ifax_c | ifax_c@abc.co.jp |
| ● | 04 | 📄 | APPLICATION FORM | ¥¥FILE SERVER¥APPLICATION FORM |
| ○ | 05 | 📄 | CLIENT INFORMATION | ¥¥FILE SERVER¥CLIENT INFORMATION |
| ○ | 06 | 📄 | APPLICATION FORM 2 | FILE SERVER¥APPLICATION FORM 2 |
| ○ | 07 | ✉ | email_g | email_g@abc.co.jp |
| ○ | 08 | 📠 | ifax_h | ifax_h@abc.co.jp |
| ○ | 09 | 📠 | fax_i | 12 3456 7890 |
| ○ | 10 | 📄 | APPLICATION FORM 3 | ¥¥FILE SERVER¥APPLICATION FORM 3 |
| ○ | 11 | 👥 | group_k | 2 |

FIG 7

```
                                          TO PORTAL    LOG OUT      4101
APPLICATION LIBRARY
APPLICATION MANAGEMENT        ONE-TOUCH TRANSMISSION SCAN > NEW BUTTON REGISTRATION
HOME SCREEN BUTTON    BUTTON EDITING              4100 — [OK] [CANCEL]
DISPLAY SETTING       DETAILED BUTTON INFORMATION
                      BASIC SETTING
                      BUTTON NAME:  4411 — [APPLICATION FORM B]  UP TO 20 CHARACTERS)
                      ☐ DISPLAY CONFIRMATION SCREEN BEFORE EXECUTION
                      FILE NAME:    [BUTTON NAME ▼]   [DESIGNATED CHARACTER STRING]
                                    [AUTOMATIC]        [FIXED CHARACTER STRING)]
                                    [CHARACTER STRING SETTING]         4120
                      ICON     4126      340
                            [ICON ADD/    ☐[📄] ☐[✓] ☐[📄] ■[📚] ☐[▲]
                             DELETE]           337  332  4124  335
                                          ☐[▲]
```

TRANSMISSION TYPE: E-MAIL ▼ [SWITCH] 4400
TRANSMISSION SETTING E-MAIL) — 4109    4107

TRANSMISSION DESTINATION: mail_a@abc.co.jp
[ADD] — 4401                            4402

TRANSMISSION DESTINATION LIST:
To:mail_a@abc.co.jp
Cc:mail_b@abc.co.jp
Bcc:mail_b@abc.co.jp
4403
[SELECT FROM ADDRESS BOOK] [SWITCH TO/CC/BCC] [DELETE]
                                              4404    4405

SETTING MENU SWITCHES FOR EACH TRANSMISSION CLASS

SCANNING SIZE: A4 ▼
COLOR MODE: COLOR ▼
FILE FORMAT: PDF ▼ — 4112
  ENCRYPTED PDF: Acrobat 10.0 PERSON/256-bit AES ▼
  ☐ SET/CHANGE PASSWORD
  PASSWORD:
  CONFIRMATION INPUT:
  ELECTRONIC SIGNATURE
  ☐ DIVIDE INTO PAGES     NONE ▼

DENSITY: 0 ▼
ORIENTATION OF ORIGINAL DOCUMENT: PORTRAIT ▼
TYPE OF ORIGINAL DOCUMENT: TEXT/PHOTOGRAPH ▼
DOUBLE-SIDED ORIGINAL DOCUMENT: OFF ▼
SHARPNESS: 0 ▼
DATA SIZE: STANDARD ▼      4407
SUBJECT:
4409 — ☐ ADD BUTTON NAME   Sending an attached file.   UP TO 20 CHARACTERS)
BODY:
4410 — ☐ ADD BUTTON NAME   A scanned document.   UP TO 20 CHARACTERS)
RETURN DESTINATION:  ● NONE    4408
                         ○ DESIGNATE FROM ADDRESS BOOK
IMPORTANCE LEVEL: NORMAL ▼

FIG. 8

| APPLICATION LIBRARY | | | | TO PORTAL LOG OUT |
|---|---|---|---|---|
| APPLICATION MANAGEMENT | ONE-TOUCH TRANSMISSION SCAN > DETAILED INFORMATION > BUTTON SELECTION > SELECT FROM ADDRESS BOOK | | | |
| HOME SCREEN BUTTON DISPLAY SETTING | SELECT FROM ADDRESS BOOK SELECT AN ADDRESS FROM THE ADDRESS BOOK AND CLICK [OK] | | | OK   CANCEL |

ADDRESS BOOK

TYPE: SPEED DIAL ▼ | DISPLAY SWITCH — 4303
                                    4502
— 4504
— 4505 E-MAIL SELECTION

| SELECTION | NUMBER | TYPE | NAME | DESTINATION |
|---|---|---|---|---|
| ☐ | 001 | ✉ | email_l | email_l@abc.co.jp |
| ☐ | 002 | ✉ | email_m | email_m@abc.co.jp |
| ☑ | 003 | 📠 | ifax_n | ifax_n@abc.co.jp |
| ☑ | 004 | 📄 | APPLICATION FORM 2 | ¥¥FILE SERVER¥APPLICATION FORM 3 |
| ☑ | 005 | 📄 | CLIENT INFORMATION 2 | ¥¥FILE SERVER¥CLIENT INFORMATION 2 |
| ☑ | 006 | 📄 | APPLICATION FORM 3 | ¥¥FILE SERVER¥APPLICATION FORM 3 |
| ☐ | 007 | ✉ | email_o | email_o@abc.co.jp |
| ☑ | 008 | 📠 | ifax_p | ifax_p@abc.co.jp |
| ☑ | 009 | 📠 | fax_q | 34 5678 9012 |
| ☑ | 010 | 📄 | APPLICATION FORM 3 | ¥¥FILE SERVER¥APPLICATION FORM 3 |
| ☐ | 011 | 👥 | group_r | 4 |

FIG. 10A

| ADDRESS BOOK | |
|---|---|
| BEST MEMBER | ADDRESS BOOK: BEST MEMBER>NEW ADDRESS REGISTRATION |
| SPEED DIAL | NEW ADDRESS REGISTRATION |

SELECT TYPE OF ADDRESS TO REGISTER AND CLICK [OK]

TYPE OF ADDRESS TO REGISTER

TYPE: ☐ ☒ E-MAIL
☐ 📄 FILE

5101

5102 [OK]  5103 [CANCEL]

| ADDRESS BOOK | | |
|---|---|---|
| BEST MEMBER | ADDRESS BOOK: BEST MEMBER>NEW ADDRESS REGISTRATION>NEW ADDRESS REGISTRATION: FILE | |
| SPEED DIAL | NEW ADDRESS REGISTRATION: FILE | |

FILE — 5201
NUMBER: 5 — 5202
NAME: REFERRAL FORM 2 — 5203
PROTOCOL: Windwos(SMB) ▼ — 5204
HOST NAME: FILE SERVER — 5205
PATH TO FOLDER: REFERRAL FORM 2 — 5206
USER NAME: iryou01 — 5207
☑ SET PASSWORD — 5208
PASSWORD: iryou01 — 5209

OK — 5210
CANCEL — 5211

ADDRESS BOOK

BEST MEMBER | ADDRESS BOOK: BEST MEMBER>NEW ADDRESS REGISTRATION>NEW ADDRESS REGISTRATION: E-MAIL

SPEED DIAL | NEW ADDRESS REGISTRATION: E-MAIL

- 5301 — E-MAIL
- 5302 — NUMBER: 6
- 5303 — NAME: REFERRAL FORM 3
- 5304 — E-MAIL ADDRESS: Iryou-backoffice-team@hospital.com

5305 — OK
5306 — CANCEL

PRESS DESTINATION SETTING ② ③ → PRESS TRANSMISSION SETTING

| ↩ | FILE | | |
|---|---|---|---|
| | SELECT DESTINATION | | DESTINATION CONFIRMATION ON |
| | DESTINATION SETTING | TRANSMISSION SETTING | ∥ RESET |
| | SCANNING SIZE | : A4R | BLACK AND WHITE START |
| | FILE FORMAT | : PDF | |
| | DENSITY | : ±0 | ◇ COLOR START |
| | FILE NAME | : abcd | ◇ STATUS CONFIRMATION |

1106

PRESS KEYBOARD INPUT ⇄ PRESS "ENTER"

| ↩ | FILE NAME | | | | | | | | | | |
|---|---|---|---|---|---|---|---|---|---|---|---|
| abcd | | | | | | | | | ▼ | ▲ | |
| q | w | e | r | t | y | u | i | o | p | - | |
| a | s | d | f | g | h | j | k | l | , | ¥ | |
| @ | z | x | c | v | b | n | m | . | / | | |
| ⇧ | LATIN SCRIPT | 1/# | SPACE | | | | | | ENTER | | |

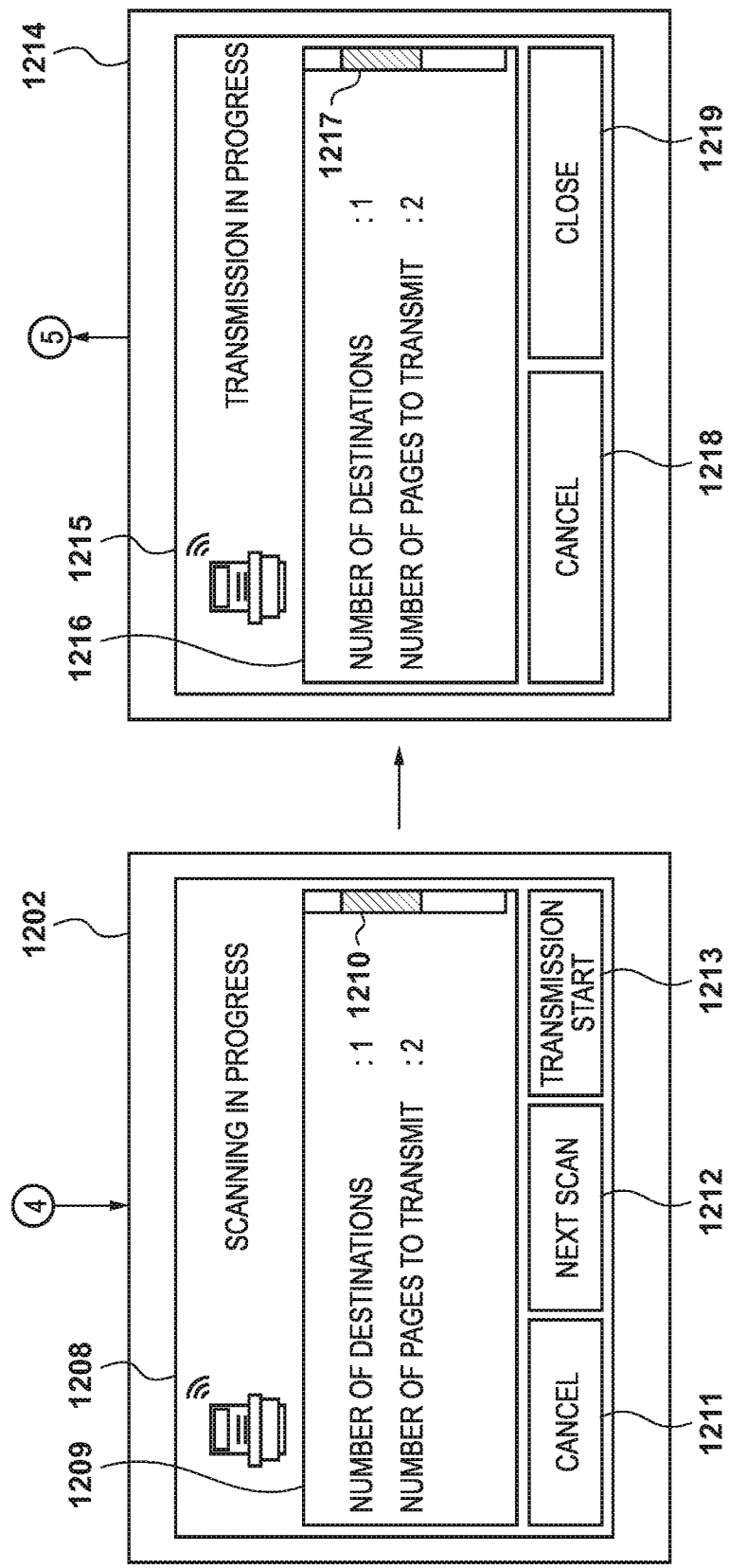

INFORMATION PROCESSING APPARATUS, METHOD OF CONTROLLING THE SAME, AND STORAGE MEDIUM

BACKGROUND OF THE INVENTION

Field of the Invention

The present invention relates to an image processing apparatus, a method of controlling the same, and a storage medium.

Description of the Related Art

A scanner and an image forming apparatus that obtain image data of an original document by scanning the original document using a scanning unit are known. A user can use these apparatuses to obtain the image data of an original document, and for example, to transmit the image data to a transmission destination such as a shared folder in a network. Hereinafter, an apparatus that scans and digitizes an original document using a scanning unit and transmits the digitized image data will be called an image transmitting apparatus.

In recent years, in business, it has become more important to digitize image data of original documents. This is because compared to the case of storing and managing original documents in paper form, when image data of an original document is digitized, needed data can be found in a shorter amount of time, and a storage location for storing the original documents and the like can be eliminated. In view of this, a method of constructing a workflow in which the scanning of the original documents, data transmission, and the like are optimally customized for a user's business has been receiving attention.

In Japanese Patent Laid-Open No. 2005-322971, in a workflow including original document scanning processing and image data transmission processing, after a user instructs scanning, a set file name, transmission destination, and the like are displayed in an icon of a file. Also, a technique is described in which when image data is obtained by scanning an original document, the image data is transmitted to the transmission destination. By doing so, it is possible to prevent transmission to the wrong transmission destination.

In order to streamline the business of a user, it is necessary to digitize and transmit image data of an original document using a simple operation. For example, taking business at a hospital as an example, at a large hospital, referral forms and questionnaires for patients referred from another hospital need to be managed for each patient. Normally, referral forms and questionnaires are in different document formats for each hospital. For this reason, for example, management is performed by adding the character string "referral form" or "questionnaire" to the file name of the image data, so that the image data can be managed and searched for easily. Alternatively, support is needed for transmitting the image data obtained by scanning a referral form or a questionnaire to a folder for the corresponding "referral form" or "questionnaire".

However, in the conventional technique, although the user can select an icon in which the file name is displayed and transmit the image data obtained through scanning, the registration of the file name needs to be performed separately from the setting of the icon.

SUMMARY OF THE INVENTION

An aspect of the present invention is to eliminate the above-mentioned problem with conventional technology.

According to a first aspect of the present invention, there is provided an image processing apparatus, comprising: a scanner that scans an original document; a memory that stores a set of instructions; and at least one processor that executes the instructions in the memory to: generate image data after the scanner scans the original document; convert the generated image data into a file; set a file name of the file; perform a transmitting process for transmitting the file with the set file name; register an operation object for transmitting the file, in association with a name of the operation object; and cause a display to display the registered operation object, wherein if the file is to be transmitted according to an operation of the displayed operation object, the at least one processor refers to the name of the operation object and sets a file name using the name in the file.

According to a second aspect of the present invention, there is provided a method of controlling an image processing apparatus having a scanner that scans scanning an original document, a memory that stores a set of instructions, and at least one processor that executes the instructions in the memory to generate image data after the scanner scans the original document, convert the generated image data into a file, set a file name of the file, and perform a transmitting process for transmitting the file with the set file name, the method comprising: registering an operation object for transmitting the file, in association with a name of the operation object; and displaying the registered operation object, wherein if the file is to be transmitted according to an operation of the operation object displayed in the displaying, the name of the operation object is referred to and a file name using the name is set in the file.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a diagram illustrating a network configuration according to an embodiment of the present invention.

FIG. 2 is a block diagram for describing a hardware configuration of an image forming apparatus according to the embodiment.

FIG. 3 depicts a view showing an example of a home screen displayed on a console unit of the image forming apparatus according to the embodiment.

FIG. 4 depicts a view showing an example of an application management screen for one-touch transmission buttons.

FIG. 5 depicts a view showing an example of a button setting editing screen for setting one-touch transmission button information according to the embodiment.

FIG. 6 depicts a view showing an example of an address selection screen that is displayed when a "select from address book" button is pressed in FIG. 5 in the embodiment.

FIG. 7 depicts a view showing an example of a button editing screen in a case where a transmission type in FIG. 5 is "e-mail".

FIG. 8 depicts a view showing an example of a screen for when an address is selected from an address book when a transmission type in FIG. 5 has been set to "e-mail" transmission.

FIGS. 10A to 10C depict views showing examples of screens for registering addresses in the address book according to the embodiment.

FIGS. 11A to 11C are diagrams for describing a flow of screens in a case where image data obtained by scanning an original document using a reading unit is transmitted by a general image forming apparatus.

FIGS. 12A-12C are diagrams for describing a flow for when a one-touch transmission button is pressed on the home screen displayed on the console unit of the image forming apparatus according to the embodiment.

DESCRIPTION OF THE EMBODIMENTS

Figure 9:
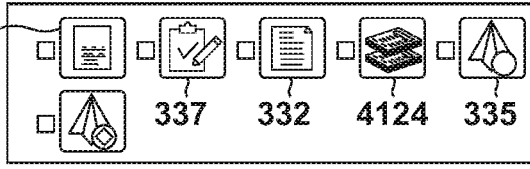
FIG. 9 depicts a view illustrating new button registration in a case where the transmission type in FIG. 5 is "USB memory".

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

FIG. 1 is a diagram illustrating a network configuration according to the embodiment of the present invention. In the present embodiment, an image forming apparatus 101 is illustrated as an example of an information processing apparatus according to the present invention and a file server 102, a mail server 103, and an online storage 106 are shown as examples of transmission destinations. In a network 100, the image forming apparatus 101, the file server 102, the mail server 103, and the PC 104 are connected so as to be able to communicate with each other. The network 100 and Internet 105 are connected, and the online storage 106, which is connected to the Internet 105, and the image forming apparatus 101 can communicate with each other.

The image forming apparatus 101 can transmit image data obtained by scanning an original document to the file server 102, the mail server 103, or the online storage 106. The image forming apparatus 101 can also store the image data obtained by scanning the original document in an external storage device 122 (e.g., a USB memory). The file server 102 is a file server that complies with FTP and SMB protocols. The mail server 103 is a mail server that complies with the SMTP protocol. The online storage 106 is an online storage that complies with WebDAV (a file sharing protocol that uses the HTTP protocol). The PC 104 can refer to or update setting values of the image forming apparatus 101 using the HTTP protocol. The PC 104 can receive and refer to electronic mail transmitted by the image forming apparatus 101. The network 100 may be connected wirelessly to an access point (not shown) if a network configuration is used in which image data can be transmitted.

The image data of the present embodiment is electronic data. Specifically, the image data is not limited to electronic data obtained by converting an image into RAW data, and may be electronic data in an image format such as TIFF or JPEG, or electronic data in a PDF format.

The file server 102 is an example of a storage destination for files, and has folders and files of folder information 107. The folder information 107 stores the file server name as "file server", the folder names as "application form" and "client information", and the image data obtained by the image forming apparatus 101 as PDF files with file names starting with the character strings of "application form A" or "questionnaire".

The mail server 103 stores the received electronic mail in a mail box provided in a storage (not shown). The PC 104 receives the electronic mail from the mail box using an electronic mail reception account set in the mail box of the mail server 103. At this time, in an example in which the PC 104 receives electronic mail transmitted by the image forming apparatus 101, the received mail information is indicated by mail information 109. Here, electronic mail to which image data obtained by scanning using the image forming apparatus 101 is attached is received with a subject and an attached file name that start with the character string of "application form B".

The external storage device 122 is an external storage device that can connect to the image forming apparatus 101, and is a storage device for storing files of image data obtained by scanning using the image forming apparatus 101. In this embodiment, a USB memory is used, but for example, the external storage device 122 may be an external storage device that stores files, such as an SD card or a hard disk. Information indicating the content of the original document (e.g., "referral form") is attached to the file name of the file of the image data obtained through scanning, as with the folder information 108 in the USB memory.

The online storage 106 is an online storage connected via the Internet 105, and stores files of image data obtained through scanning by setting a URL as a transmission destination and using an account name and password information for accessing the storage.

FIG. 2 is a block diagram for describing a hardware configuration of the image forming apparatus 101 according to the embodiment.

A control unit 210 including a CPU 211 controls the overall operation of the image forming apparatus 101. The CPU 211 deploys a control program stored in a ROM 212 or a storage 214 to a RAM 213 and executes the deployed program to perform various types of control, such as scanning control and printing control. The ROM 212 stores a control program that can be executed by the CPU 211. The ROM 212 stores a boot program, font data, and the like as well. The RAM 213 is a main storage memory of the CPU 211, and is used as a work area and a temporary storage region for deploying various types of control programs stored in the ROM 212 and the storage 214. The storage 214 stores image data, print data, an address book, various types of programs, and various types of setting information. In this embodiment, a flash memory is envisioned as the storage 214, but for example, an auxiliary storage device such as an SSD, an HDD, or an eMMC may be used thereas.

In the image forming apparatus 101, one CPU 211 executes the processing shown in later-described flowcharts using one memory (RAM 213), but another mode may also be used. For example, the processing shown in the later-described flowcharts can also be executed by allowing multiple CPUs, RAMs, ROMs, and storages to operate in cooperation. Also, some of the processing may be executed using a hardware circuit such as an ASIC or an FPGA.

A reading unit I/F (interface) 215 connects a reading unit 216 and the control unit 210. The reading unit 216 scans an image of an original document and converts the image into image data, such as binary data. The image data generated by the reading unit 216 is transmitted to an external apparatus, stored in an external storage device 122, or printed onto recording paper (sheet) by a print unit 220. The console unit I/F 217 connects a console unit 218 and the control unit 210. The console unit 218 displays information to the user and detects input from the user. The print unit I/F 219 connects the print unit 220 and the control unit 210. The CPU 211 transfers image data to be printed to the print unit 220 via the print unit I/F 219. The print unit 220 prints the image onto recording paper supplied from a paper supply cassette (not shown). The external storage I/F 221 connects the external storage device 122 and the control unit 210. The CPU 211 stores the image data in the external storage device 122 via the external storage I/F 221. Note that in this embodiment, a USB interface is envisioned as the external storage I/F 221 and a USB memory is envisioned as the external storage device 122, but it is also possible to use an external storage device such as an SD card.

A communication unit I/F 223 connects the network 100 and the control unit 210. The communication unit I/F 223 can carry out transmission of image data to the file server 102, transmission of electronic mail to the mail server 103, transmission of image data to the online storage 106, and transmission of various types of setting information inside of the apparatus to the PC 104. The communication unit I/F 223 receives a request to refer to or modify various types of setting information inside of the apparatus from the PC 104, and reads out or modifies the various types of setting information in the storage 214. As for the transmission of the image data, a file is transmitted using a protocol such as FTP, SMB, WebDAV, or SMTP. Also, a Web server application that processes HTTP transmits the various types of setting information to the PC 104 and receives modification of the various types of setting information from the PC 104. The Web server application is stored in the ROM 212 and is disposed in the RAM 213 after being started up. The CPU 211 executes HTTP connection control via the communication unit I/F 223 by reading out the Web server application from the RAM 213 and executing it.

FIG. 3 depicts a view showing an example of a home screen displayed on console unit 218 of the image forming apparatus according to the embodiment.

The console unit 218 is equipped with a touch panel 300 that displays an operation screen, a data LED 320, and an error LED 321. The touch panel 300 functions as a touch panel and as input means for receiving an instruction (touch, drag, flick, etc.) from the user. The user directly touches images (buttons) on the screen displayed on the touch panel 300 with a finger or an object such as a stylus, and instructs the execution of functions based on the displayed image. "Button" in the embodiment means a segmented region indicated by a frame of a displayed image, and the CPU 211 of the image forming apparatus 101 executes control relating to the displayed image due to detecting a touch (pressing) of the button via the console unit I/F 217.

Immediately after the image forming apparatus 101 is started up, the touch panel 300 displays the home screen shown in FIG. 3, for example. The home screen includes buttons (frequently-used setting button 308, scan button 301, menu button 307, address book button 306, application form A button 302, application form B button 303, questionnaire button 304, referral form button 305, etc.) for functions executed by the image forming apparatus 101.

A status confirmation button 309 is a button for displaying a status confirmation screen (not shown) for confirming the status of the image forming apparatus 101. The print status, transmission status, transmission history, and the like are displayed on the status confirmation screen.

The frequently-used setting button 308 is a shortcut button that calls for information such as a destination setting on a transmission screen for e-mail, files, and the like selected with the scan button 301, and original document scanning settings, and transitions to a transmission/reception screen.

The scan button 301 is a button for transitioning to a various transmission settings screen for executing electronic mail transmission (e-mail) and file transmission by means of SMB, FTP, or WebDav from the image forming apparatus 101. The menu button 307 is a button for transitioning to a various settings menu screen of the image forming apparatus 101. The address book button 306 is a button for displaying an address book screen (not shown) of the image forming apparatus 101. The transmission destination for e-mail, file transmission, or the like is designated, and the display transitions to a transmission setting screen from the address book screen. Address book data is stored in the storage 214, and stores settings relating to the destination information that is to be transmitted, for each destination. The destination information includes the transmission type (e-mail, file, fax, etc.), name, and destination information (electronic mail address, host name, server information, etc.). In addition, with the destination information, it is possible to not only set a single transmission type, but it is also possible to set a broadcast in which multiple pieces of set destination information are designated.

The application form A button 302, the application form B button 303, the questionnaire button 304, and the referral form button 305 are all one-touch transmission buttons. A one-touch transmission button is a button that, when pressed, causes an original document to be scanned according to pre-determined settings corresponding to the button and causes the obtained image data to be transmitted to a set destination.

The application form A button 302 includes a file transmission icon 331 indicating file transmission as the transmission type, a document icon 332, and a button name "application form A" 333, and displays display data generated based on the home screen information for the button arrangement 5 (Table 1). In Table 1, the application form A button 302 is set at the button arrangement 5, the icon information is set to the document icon 332, the function is set to one-touch transmission, and the button ID is set to "1".

The application form B button 303 includes a mail transmission icon 334 indicating electronic mail transmission as the transmission type, a destination transmission icon 335, and a button name "application form B" 336, and displays the display data generated based on the home screen information for the button arrangement 6 (Table 1). In Table 1, the application form B button 303 is set at the button arrangement 6, the icon information is set to the destination transmission icon 335, the function is set to one-touch transmission, and the button ID is set to "2".

The questionnaire button 304 includes the file transmission icon 331, a questionnaire icon 337, and a button name "questionnaire" 338, and displays the display data generated based on the home screen information for the button arrangement 7 (Table 1). In Table 1, the questionnaire button 304 is set at the button arrangement 7, the icon information is set to the questionnaire icon 337, the function is set to one-touch transmission, and the button ID is set to "4".

The referral form button 305 includes a USB memory icon 339 for storing the scanned image in a USB memory as the transmission type, a referral form icon 340, and a button name "referral form" 341, and displays the display data generated based on the home screen information for the button arrangement 8 (Table 1). In Table 1, the referral form button 305 is set at the button arrangement 8, the icon information is set to the referral form icon 340, the function is set to one-touch transmission, and the button ID is set to "3".

Home screen page display 342 shows the page of the home screen. Since the first page is being displayed, "1" is displayed on the home screen in FIG. 3. By flicking the screen on the touch panel 300 rightward, the page of the home screen is switched to 2, 3, and 4, and the displayed numeral moves rightward and switches to 2, 3, and 4. For example, page 2 switches to "•2••", page 3 switches to "••3•", and page 4 switches to "•••4".

A stop button 311 is a button for cancelling the operations of the image forming apparatus 101. The stop button 311 is always displayed on the console unit 218. A home button 310 is a button for displaying the home screen. The home button 310 is always displayed on the console unit 218.

The data LED 320 and the error LED 321 notify the user of the state of the image forming apparatus 101. The data LED 320 turns on during execution of a transmission job or a printing job, and the error LED 321 turns on when some kind of error (jamming, no paper, etc.) occurs in the image forming apparatus 101.

Next, the button information for home screen display in the embodiment will be described with reference to Table 1 below (home screen information). In Table 1, the arrangement on the screen, the names of buttons, the icon information, and information relating to the functions of the buttons are stored in association with each other and in association with each button.

TABLE 1

| Button arrangement | Button name | Icon information | Function | Button ID |
|---|---|---|---|---|
| 1 | Frequently-used setting | Frequently-used setting | Frequently-used setting | |
| 2 | Scan | Scan | Scan | |
| 3 | Menu | Menu | Menu | |
| 4 | Address book | Address book | Address book | |
| 5 | "Application form A" | Document icon 332 | One-touch transmission | 1 |
| 6 | "Application form B" | Destination transmission icon 335 | One-touch transmission | 2 |
| 7 | "Questionnaire" | Questionnaire icon 337 | One-touch transmission | 3 |
| 8 | "Referral form" | Referral form icon 340 | One-touch transmission | 4 |
| 9 | Copy | Copy | Copy | |

The home screen information shown in Table 1 shows information relating to each button displayed on the home screen in FIG. 3. The information of the home screen according to the embodiment is held in the storage 214 and the CPU 211 loads the home screen information from the storage 214 and displays the home screen information. In the button arrangement of the home screen, the positions of the eight buttons on the home screen are, in order starting from the upper left, 1, 2, 3, and 4, and, in order starting from the lower left, 5, 6, 7, and 8, and on the next screen, information on the buttons displayed at each position is stored similarly from 9 to 16. Accordingly, the button for which the button name in Table 1 is "Copy" is displayed on the next screen.

The button names in Table 1 indicate character strings displayed as the names of the buttons in button display. The icon information indicates icon data, and pre-determined icons are set for the buttons for basic functions such as copy and scan, and for the buttons for registered functions, such as menu and address book. Also, the icon displays for the one-touch transmission buttons for "application form A", "application form B", "questionnaire", and "referral form" can be set through button editing, and the display thereof can be modified using icon setting 4127 (FIG. 5) in the one-touch transmission button information 407 (FIG. 4). "Function" in the home screen information indicates function screens that are transitioned to when the buttons are pressed. The buttons for "application form A", "application form B" "questionnaire", and "referral form" also store button IDs 1 to 4 in the one-touch transmission button information 407 (FIG. 4) set on the screen for editing the buttons for one-touch transmission. The one-touch transmission buttons determine the display data of the buttons based on the one-touch transmission button information 407 obtained with later-described button IDs for one-touch transmission.

In the embodiment above, the images and names of the buttons to be displayed on the home screen are set in advance by the user, thus making it easier to understand which kind of original document the button is for scanning based on the button that is displayed before the button is pressed. By further displaying the transmission type as a sub-icon in the button display, it is easier to understand the transmission method for the original document to be transmitted before the button is pressed.

Next, setting of the one-touch transmission buttons, namely the application form A button 302, the application form B button 303, the questionnaire button 304, and the referral form button 305, will be described with reference to FIGS. 4 to 9. FIGS. 4 to 9 are displayed on a display apparatus (not shown) of the PC 104 by connecting through HTTP to the image forming apparatus 101 using a Web browser of the PC 104.

FIG. 4 depicts a view showing an example of an application management screen for one-touch transmission buttons.

Application name 400 is a region for displaying the name of the application displaying this screen, and displays the name "One-touch transmission scan". One-touch transmission scan is an application for scanning an original document and transmitting image data obtained by the scanning, in accordance with content set beforehand. One-touch transmission scan can register multiple buttons.

Application information 401 is a region for displaying information relating to the application, and in the embodiment, the version number "1.00" is displayed therein. Although not illustrated, the size of the application and the like may also be displayed as the application information. New button registration 402 is a button for creating a button for executing one-touch transmission. When the new button registration 402 is pressed, a setting editing screen is displayed and setting values are displayed as initial values or in a non-input state. The button information region 403 is a region for displaying the button names, transmission types, and display states, and the registered one-touch transmission button information 407 is displayed therein. Also, display state 404 includes the state of being displayed or not being displayed, a display/non-display switching button 405, and a delete button 406.

The button names of the one-touch transmission button information 407 can be selected using the character strings displayed underlined with broken lines. When a button name is selected, a setting editing screen is displayed, and the setting values are displayed with the set values already input. Button name (FIG. 5) set in the setting editing screen is displayed as the button name in the transmission destination 4110. The transmission type is a region for displaying the transmission type set for the one-touch transmission button. Transmission types 4107 (FIG. 5) set in the setting editing screen are displayed as the transmission types.

Display state 404 displays whether or not a button is to be displayed on the touch panel 300. If the display state 404 is "displayed", the button is displayed on the touch panel 300, and if the display state 404 is "not displayed", the button is not displayed on the touch panel 300. The display/non-display switching button 405 is a button that can toggle between "displayed" and "not displayed" for the buttons. When the display/non-display switching button 405 is pressed, the display of the display state 404 is switched. The delete button 406 is a button for setting/deleting the one-touch transmission button. In the button information region 403, five buttons, namely "application form A", "application form B", "referral form", "questionnaire", and "application form C" have been registered as button names. Since the display states 404 of "application form A", "application form B", "referral form", and "questionnaire" have been set to "displayed", the buttons will be displayed on the touch panel 300. However, since the display state 404 of "application form C" has been set to "not displayed", the button will not be displayed on the touch panel 300. The button settings stored in the button information region 403 are stored as the one-touch transmission button information 407 in the storage 214 for one-touch transmission 1 to one-touch transmission 5. An example of the one-touch transmission button information 407 is shown in Table 2 below.

TABLE 2

| Button ID | Button name | Icon | Transmission type | Display state | Button setting data |
|---|---|---|---|---|---|
| 1 | Application form A | Document icon 332 | File | Displayed | Setting 1 |
| 2 | Application form B | Destination transmission icon 335 | E-mail | Displayed | Setting 2 |
| 3 | Questionnaire | Questionnaire icon 337 | File | Displayed | Setting 3 |
| 4 | Referral form | Referral form icon 340 | USB memory | Displayed | Setting 4 |
| 5 | Application form C | Document icon 4124 | USB memory | Not displayed | Setting 5 |

The one-touch transmission button information 407 shown in Table 2 is constituted by the button names, icon information, transmission types, display states 404, and button setting data for the button IDs 1 to 5 of the registered buttons. Here, the button names are the button names 4102 in FIG. 5, and the button name 4102 is set to "application form A" in FIG. 5. Also, the icon information is set according to the icon setting 4127 in FIG. 5. Furthermore, the transmission types are set according to the transmission type 4107 in FIG. 5. Settings 1 to 5 of the button setting data indicate the setting content of the button setting editing screen that is displayed when the button with the button name is pressed, and the items and setting content set in the button setting editing screen will be shown in the button setting data in the next table. Note that the set items and content for the button setting data will be described later with reference to FIGS. 5 to 9.

Table 3 shows a list of information that can be set for the one-touch transmission buttons. Note that the reference numerals in Table 3 correspond to the reference numerals shown in FIGS. 4 to 9.

TABLE 3

| Item | Content |
|---|---|
| Confirmation screen display (before execution) check box 4113 | ON/OFF |
| File name setting 4103 | Button name, automatic, character string, (button name in quotation marks, tag setting, . . . ) |
| Character string added to file name edit box 4104 | Character string |
| Transmission destination 4110 | Character string |
| Address book | Address book number |
| File format 4112 | PDF/TIFF JPEG |
| Subject edit box 4407 | Character string |
| Body edit box 4408 | Character string |
| Storage in folder with button name check box 4114 | ON/OFF |
| Add button name to subject check box 4409 | Add, do not add (button name in quotation marks, tag setting, . . . ) |
| Add button name to body check box 4410 | Add, do not add (button name in quotation marks, tag setting, . . . ) |

FIG. 5 depicts a view showing an example of a button setting editing screen for setting the one-touch transmission button information 407 according to the embodiment.

OK button 4100 is a button for establishing the button settings with the content set on the button setting editing screen. When the OK button 4100 is pressed, the established settings of the one-touch transmission button information 407 is stored in the storage 214. A cancel button 4101 is a button for discarding the content set on the button setting editing screen. When the OK button 4100 or the cancel button 4101 is pressed, the display returns to the screen of FIG. 4.

Button name 4102 is an edit box for setting a button name. File name setting 4103 is a list box for selecting a file name naming method. In file name setting 4103, one of "button name", "automatic", and "character string" can be selected. "Button name" is selected in the case where the button name set in button name 4102 is to be reflected in the file name. "Automatic" is selected in the case where the file name is to be decided automatically. "Character string" is selected in the case where a fixed character string is input in an edit box 4104 and the character string is to be reflected in the file name. Note that it is not necessary to set file name setting 4103 in the present embodiment, and if there is no setting of file name setting 4103, operation is always performed with "button name" set. Furthermore, file name setting 4103 can be set to a button name in quotation marks ("application form A"), or a button name in which hashtags are embedded in a character string input in the edit box 4104 (e.g., replacing "application form A" with "# button name #").

The check box 4113 for "display confirmation screen before execution" (confirmation screen display) is a check box for checking whether to display the confirmation screen when the button is pressed on the LUI, or to execute one-touch transmission without displaying the confirmation screen. If there is a check in the check box 4113, when the button is pressed, one-touch transmission is executed after the confirmation screen is displayed, and if there is no check in the check box 4113, one-touch transmission is executed immediately after the button is pressed.

Icon setting 4127 includes check boxes for respectively selecting an icon image (icons 340, 337, 332, 4124, 335, etc.) to be displayed as a button. The icon 340 is the referral form icon. The icon 337 is the questionnaire icon. The icon 332 is the document icon. The icon 4124 is also a document icon. The icon 335 is the destination transmission icon. If no selection has been made, the destination transmission icon 335 is displayed as the default icon image in the button. By dragging a scroll bar 4120, it is possible to display and select an icon image (not shown) other than the icons shown in the drawing. Also, icon images can be added or deleted from a displayed icon file selection screen (not shown) that is displayed by pressing an add/delete button 4126.

Transmission type 4107 and switching button 4108 are settings related to the transmission method. Transmission type 4107 is a list box for selecting the transmission type. In transmission type 4107, it is possible to select one of "file", "e-mail", and "USB memory". "File" is selected when a file is to be transmitted using a file transmission protocol such as SMB, FTP, and WebDAV. "E-mail" is selected in the case of performing transmission using SMTP, which is a mail transmission protocol. "USB memory" is selected in the case of performing storage in the USB memory (external storage device 122) mounted in the image forming apparatus 101. The switching button 4108 is a button for deciding on the transmission type. When the switching button 4108 is pressed, the display item of transmission setting 4109 changes according to the selection of transmission type 4107. If transmission type 4107 is currently "file", the transmission type shown in FIG. 5 is displayed. If transmission type 4107 is "e-mail", the transmission type shown in FIG. 8 is displayed.

Transmission type 4107 of FIG. 5 is a setting item that is needed for "file" transmission. Although multiple setting items exist, description will be given only for the items related to the present embodiment.

Transmission destination 4110 and a "select from address book" button 4111 are settings relating to the transmission destination. The transmission destination 4110 is a text display region that cannot be edited, and displays the transmission destination selected using the "select from address book" button 4111. The "select from address book" button 4111 is a button for setting the transmission destination from the address book of the image forming apparatus 101. If the "select from address book" button 4111 is pressed, the address selection screen (FIG. 6) is displayed. File format 4112 is a setting item relating to the format of the image data. The image data is converted into electronic data with a format conforming to the setting of the file format 4112.

A check box 4114 is a check box for performing storage in a folder with the button name, which is designated in the transmission destination. If the check box 4114 is ON, a folder name that is the same as the button name 4102 is designated in the transmission destination folder and the file is transmitted thereto.

A check box 4115 is a check box for adding the button name to the file attribute of the file to be transmitted. If the check box 4115 is ON, the button name is added to the file attribute of the electronic data. If the transmitted file is a PDF file, the button name is added to the file attribute (title, comment, keyword) indicated in a list box 4116.

FIG. 6 depicts a view showing an example of an address selection screen that is displayed when the "select from address book" button 4111 is pressed in FIG. 5 in the embodiment.

An OK button 4300 is a button for establishing the address selection with the content set on the address selection screen. A cancel button 4301 is a button for canceling the setting content. When the OK button 4300 or the cancel button 4301 is pressed, the display returns to FIG. 5. Note that when the OK button 4300 is pressed, the selected address is reflected in the transmission destination 4110 of FIG. 5.

Type 4302 and a display switching button 4303 are for deciding on the address book for performing address selection. The type 4302 is a list box in which one of "best member" and "speed dial" can be selected. "Best member" and "speed dial" are both address books, and e-mail addresses and addresses of transmission destinations (server names and folders) of files are registered therein. The display switching button 4303 is a button for deciding on the address book for performing address selection. When the display switching button 4303 is pressed, a name 4304 of the address book selected with the type 4302 is displayed. Also, an address list 4305 of the selected address book is displayed.

Address book name 4304 is a display region in which the name of the address book is displayed. The address list 4305 is a region in which a list of addresses registered in the address book are displayed, and is constituted by selection, number, type, name, and destination. Selection displays check boxes for selecting addresses. One of two types of check boxes, namely a checkable check box and an uncheckable check box, is displayed as each check box. Number displays the management numbers of the addresses. Type is a region in which icons are displayed, and the displayed icons differ according the types of the addresses. Name displays names provided for the addresses. Destination displays the addresses. One of two types of check boxes, namely a checkable check box and an uncheckable check box, is displayed as each check box.

Additional description of the display of the checkable check boxes and the uncheckable check boxes will be given hereinafter. FIG. 6 shows display in the case of selecting an address from an address book of "best members" in which four addresses for "file" are registered, with "file" being selected as the transmission type 4107. The checkable check boxes are displayed for addresses whose type matches the transmission type 4107. Specifically, the checkable check box is displayed for the addresses of number 04 to number 06 and number 10. As for the other transmission types, uncheckable check boxes are displayed for the addresses at number 01, number 02, and number 07 for "e-mail", the addresses at number 03 and number 08 for "I-fax", the address at number 09 for "fax", and the address at number 11 for "group".

The examples of FIGS. 5 and 6 will be summarized. In FIG. 5, which shows a screen for setting the "application form A" button, "application form A" is set as the button name 4102, "button name" is set as the file name setting 4103, the check box 4114 is checked, and "file" is set as the transmission type 4107. As the transmission destination of the "application form A" button, in FIG. 6, the destination "¥¥File Server¥application form" of number 04 has been selected. Thus, by setting the transmission destination, the file setting, the scanning setting, and the like in the settings for the "application form A" button, the application form A can be read and stored in the designated transmission destination folder by merely pressing the "application form A" button.

FIG. 7 depicts a view showing an example of a button editing screen in a case where the transmission type 4107 in FIG. 5 is "e-mail". Note that in FIG. 7, the portions that are the same as those in FIG. 5 are indicated by the same reference numerals thereas and description thereof is omitted.

In FIG. 7, setting of an "application form B" button is illustrated as an example. The OK button 4100, the cancel button 4101, and the transmission type 4107 will not be described since they are similar to those of FIG. 5. In FIG. 7, multiple setting items that are the same as those of FIG. 5 are present, but hereinafter, description will be given only for items relating to the embodiment. Transmission destination 4400, an add button 4401, a transmission destination list 4402, a "select from address book" button 4403, a To/Cc/Bcc switching button 4404, and a delete button 4405 are settings relating to the transmission destination in the case where the transmission type 4107 is "e-mail".

The transmission destination 4400 and the add button 4401 are used when setting a new transmission destination in the transmission destination list 4402. The transmission destination 4400 is an edit box, and can receive input of an e-mail address from a keyboard (not shown) of the PC 104. The add button 4401 is pressed when an e-mail address input to the transmission destination 4400 is to be set in the transmission destination list 4402.

The transmission destination list 4402 is a text display region in which e-mail addresses can be selected. The transmission destination list displays field names and e-mail addresses for when e-mail transmission is performed. The field names for when e-mail transmission is performed display one of To, Cc, or Bcc. Note that the initial value of the field name during addition of an e-mail address to the transmission destination list 4402 is To.

The "select from address book" button 4403 is a button that is pressed when an address is to be selected from an address book. When the "select from address book" button 4403 is pressed, an address selection screen (FIG. 8) is displayed. When an address is selected on the address selection screen (FIG. 8), the address is displayed in the transmission destination list 4402.

The To/Cc/Bcc switching button 4404 is a button that is pressed when the field name is to be changed. When an address is selected in the transmission destination list 4402 and the To/Cc/Bcc switching button 4404 is pressed, the initial value for the field name can be switched cyclically in the following order: To→Cc→Bcc→To.

The delete button 4405 is a button for deleting an address from the transmission destination list 4402. When an address is selected from the transmission destination list 4402 and the delete button 4405 is pressed, the selected address is deleted from the transmission destination list 4402.

The items subject edit box 4407 and body edit box 4408 are edit boxes for inputting character strings to be set in the subject and the body of the electronic mail to be transmitted when electronic mail transmission with the transmission type "e-mail" is to be executed by the image forming apparatus 101. The character strings input here are set in the subject and body of the electronic mail to be transmitted. Button name addition check box 4409 is a check box for giving an instruction to add the button name to the subject. If the button name addition check box 4409 has been checked, the character string "application form B" is added to the front of the subject of the electronic mail to be transmitted.

Thus, by using a setting in which the button name is added to the information of the subject and body of the transmitted e-mail in FIG. 7, the receiver of the e-mail can judge which button was pressed to transmit the e-mail, as in the e-mail information 109 (FIG. 1) of the application for confirming the e-mail. In FIG. 7, by transmitting the original document of application form B with the button name of application form B, the receiver of the e-mail can judge based on the subject and body of the e-mail whether or not the image file of the application form B is attached.

FIG. 8 depicts a view showing an example of a screen for when an address is to be selected from an address book in a case where the transmission type 4107 in FIG. 5 has been set to "e-mail" transmission.

When the OK button or the cancel button is pressed, the display returns to FIG. 7. Note that when the OK button is pressed, the address selected on the screen is reflected in the transmission destination 4400 of FIG. 7.

Type 4502 is an address book display for when the display of the type of the address book has been switched to "speed dial". "Speed dial", which was designated in the type 4502 of the address book, is displayed in name 4504. Also, an address list 4505 of the selected address book for speed dial is displayed.

The address list 4505 for speed dial is a region in which an address list is displayed, and includes selection, three-digit numbers, types, names, and destinations. In selection, check boxes for selecting e-mail addresses are displayed. One of two types of check boxes, namely a checkable check box and an uncheckable check box, is displayed as each check box. Display other than that is the same as in FIG. 6.

Additional description of the display of the checkable check boxes and the uncheckable check boxes will be given hereinafter. FIG. 8 shows an example of display for speed dial in which "e-mail" has been selected as the transmission type 4107 in FIG. 5. FIG. 8 is displayed when an "e-mail" address is to be selected from a speed dial address book in which three addresses with the transmission type "e-mail", four addresses with the transmission type "file", and one address with the transmission type "group" have been registered. Checkable check boxes are displayed for addresses for which the setting of the transmission type 4107 and the type of transmission type match. Specifically, uncheckable check boxes are displayed for the addresses at numbers 003 to 006 and 008 to 010, and checkable check boxes are displayed for the addresses at numbers 001, 002, 007, and 011. Here, the address with the transmission type "group" at number 011 is displayed with a checkable check box because it is an address in which multiple address book addresses whose transmission types are set to "e-mail" are set. The checkable check box is not displayed for a "group address" in which "file", "I-fax", or the like, which are different transmission types, are included.

FIG. 9 depicts a view illustrating registration of a new button in a case where the transmission type 4107 in FIG. 5 is "USB memory". In FIG. 9, setting of a "referral form" button 305 is illustrated as an example. Note that in FIG. 9, portions that are the same as those in FIG. 5 described above are denoted by the same reference numerals thereas, and description thereof is omitted.

The transmission type 4107 is set to "USB memory", and here, although multiple setting items are present, only the items relating to the present embodiment will be described. If the transmission type 4107 is "USB memory", the image data is stored in the USB memory (external storage device 122). For this reason, settings relating to the transmission destination are not displayed in transmission setting 4601. Also, the check box 4114 is a check box for storing in a folder with the button name. When the check box 4114 is checked, the file is stored in the folder "referral form", which was input in button name 4603. If there is no folder "referral form" of button name 4603 in the USB memory, the folder is newly generated and the file is stored therein.

FIGS. 10A to 10C depict views showing examples of screens for registering addresses in an address book according to the embodiment. The screens are displayed on the display apparatus (not shown) of the PC 104 due to performing HTTP connection to the image forming apparatus 101 from the PC 104 using a browser.

FIG. 10A shows an example of a new destination registration screen. The address book selection region 5100 is a region for selecting an address book in which an address is to be registered. Two address books, namely "best member" and "speed dial" are displayed in the address book selection region 5100, and either one can be selected. In FIGS. 10A to 10C, "best member" is illustrated as having been selected as the address book.

Type of destination to register 5101 is a region for selecting the type of address to register. Here, either one of "e-mail" and "file" can be selected, and the selection is performed using a radio button. OK button 5102 is a button that is pressed when detailed information of the address is to be input. When the OK button 5102 is pressed while "file" is selected, the screen of FIG. 10B is displayed. When the OK button 5102 is selected while "e-mail" is selected, the screen of FIG. 10C is displayed. A cancel button 5103 is a button that is pressed when the content set using the screen is to be discarded and the address book registration is to be canceled.

FIG. 10B shows an address registration screen relating to "file". The address book display region 5200 is a region for displaying an address book in which an address is to be registered. In FIG. 10B, "best member" has been selected. Reference number 5201 denotes a region for setting detailed settings for a file. The region 5201 includes settings for 5202 to 5209.

Number 5202 is a unique management number in the address book "best member". Name 5203 is an edit box for setting an address name. Protocol 5204 is a list box in which the protocol to be used for transmission is selected. In protocol 5204, one of three types, namely SMB, FTP, and WebDAV, can be selected. SMB has been selected in FIG. 10B. Host name 5205 is an edit box for setting the host name for transmission. A server name that can solve an IP address or an IP address is input. Path to folder 5206 is an edit box for designating which folder in the server designated in the host name 5205 is to be set in the transmission destination. User name 5207 is an edit box for setting the user name for accessing the server designated in the host name 5205. A check box 5208 is checked when a password is to be used when accessing the server designated in the host name 5205. When the check box 5208 is checked, a password set in password 5209 is used when accessing the server designated in the host name 5205. Password 5209 is an edit box for setting the password for accessing the server designated in the host name 5205. An OK button 5210 is a button for establishing the button settings with the content set on this screen. When the OK button 5210 is pressed, the established settings are stored in the storage 214 of the image forming apparatus 101. A cancel button 5211 is a button for discarding the content set on the screen.

FIG. 10C shows an example of an address registration screen relating to "e-mail".

An address book display region 5300 is a region for displaying an address book in which an address is to be registered. In FIG. 10C, "best member" has been selected. Reference numeral 5301 denotes a region for setting detailed settings for e-mail. The region 5301 includes settings for 5302 to 5304.

Number 5302 is a unique management number in the address book "best member". Name 5303 is an edit box for setting an address name. E-mail address 5304 is an edit box for setting the e-mail address to be transmitted to. The OK button 5305 is a button for establishing the button setting with the content set on the screen. When the OK button 5305 is pressed, the established settings are stored in the storage 214 of the image forming apparatus 101. The cancel button 5306 is a button for discarding the content set on the screen.

Figure 11A:
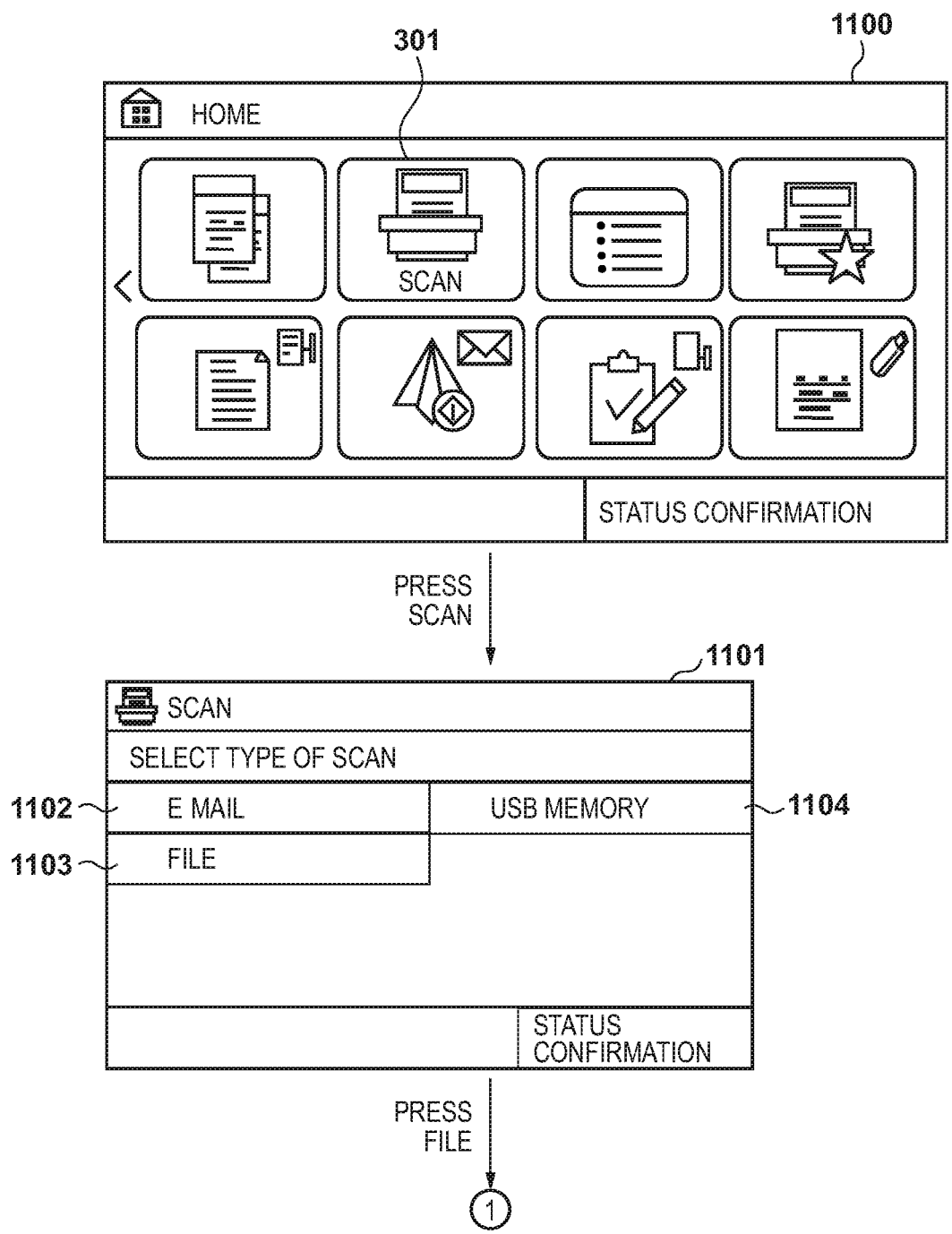
Figure 11B:
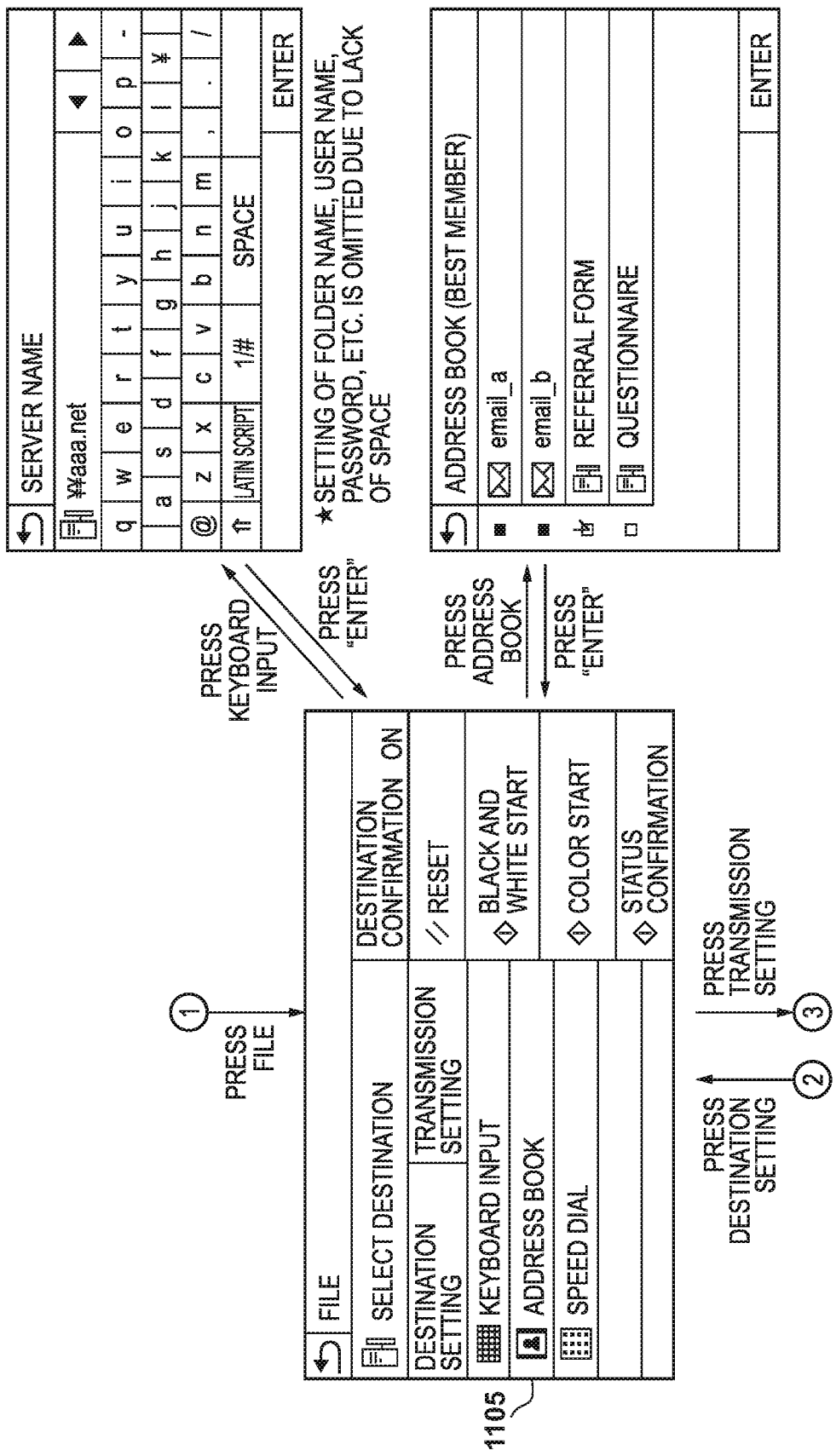

FIGS. 11A to 11C are diagrams for describing a flow of screens in a case where the image data obtained by scanning an original document using the reading unit 216 is transmitted by a common image forming apparatus. Note that the screens illustrated in FIGS. 11A-11C are displayed on the touch panel 300 of the image forming apparatus.

After placing the original document on the reading unit 216, the user presses the scan button 301 on a home screen 1100. Accordingly, a scan screen 1101 for selecting the processing of the image data obtained through scanning is displayed. Three options, namely e-mail 1102, file 1103, and USB memory 1104, are displayed on the screen for selecting the processing of the image data. Here, the user selects the USB memory 1104 if the user wants to store the image data in the USB memory (external storage device 122). On the other hand, the user selects the e-mail 1102 if the user wants to transmit the image data to the mail server 103 by e-mail. The user selects the file 1103 if the user wants to transmit the image data to the file server 102 or the online storage 106. FIGS. 11A to 111C illustrate a case in which the user has selected the file 1103.

When the user selects the file 1103, "screen for designating a destination" 1105 is displayed. The "screen for designating a destination" 1105 is divided into "destination setting" and "transmission setting", and in "destination setting", settings relating to the transmission destination are performed. In "transmission setting", settings related to the image data, such as the scanning size of the original document and the format of the image data, are performed.

On the "destination setting" screen 1105, settings relating to the transmission destination can be input using a keyboard, or the transmission destination can be selected from an address book. On the "transmission setting" screen 1106, the file name can be designated using a keyboard. In the case of designating using a keyboard, setting of the protocol 5204, path to folder 5206, user name 5207, and password 5209 in FIG. 10B are also performed, but in FIGS. 11A-11C, this is not illustrated.

When the user designates the destination on the "screen for designating a destination" 1105, a "black and white start" or "color start" button can be pressed. "Black and white start" is a button that is pressed when the image of the original document is to be digitized in grayscale, and "color start" is a button that is pressed when the image of the original document is to be digitized in color. When the user designates the destination on the screen for designating a destination and presses the "black and white start" or "color start" button, the scanning of the original document is started by the reading unit 216, and the image data obtained through the scanning is transmitted to the designated destination.

In this standard screen flow, if the image data is to be transmitted with the file name to which the button name is added, the user needs to perform many screen operations. For example, if the image data is to be transmitted with a file name to which a button name is added, a screen operation for displaying the "transmission setting" screen is performed, and thereafter the file name is input. If the image data is to be transmitted, the user needs to perform a screen operation for displaying the "designation setting" screen, and thereafter use keyboard input to input the server name, protocol, user name, and password. Alternatively, the user needs to use the address book registration screen shown in FIG. 10B to create an address book in which the address to the folder that is the transmission destination has been input. In either case, in the standard screen flow, the setting for transmitting a file with a button name added takes a lot of effort.

Figure 12A:
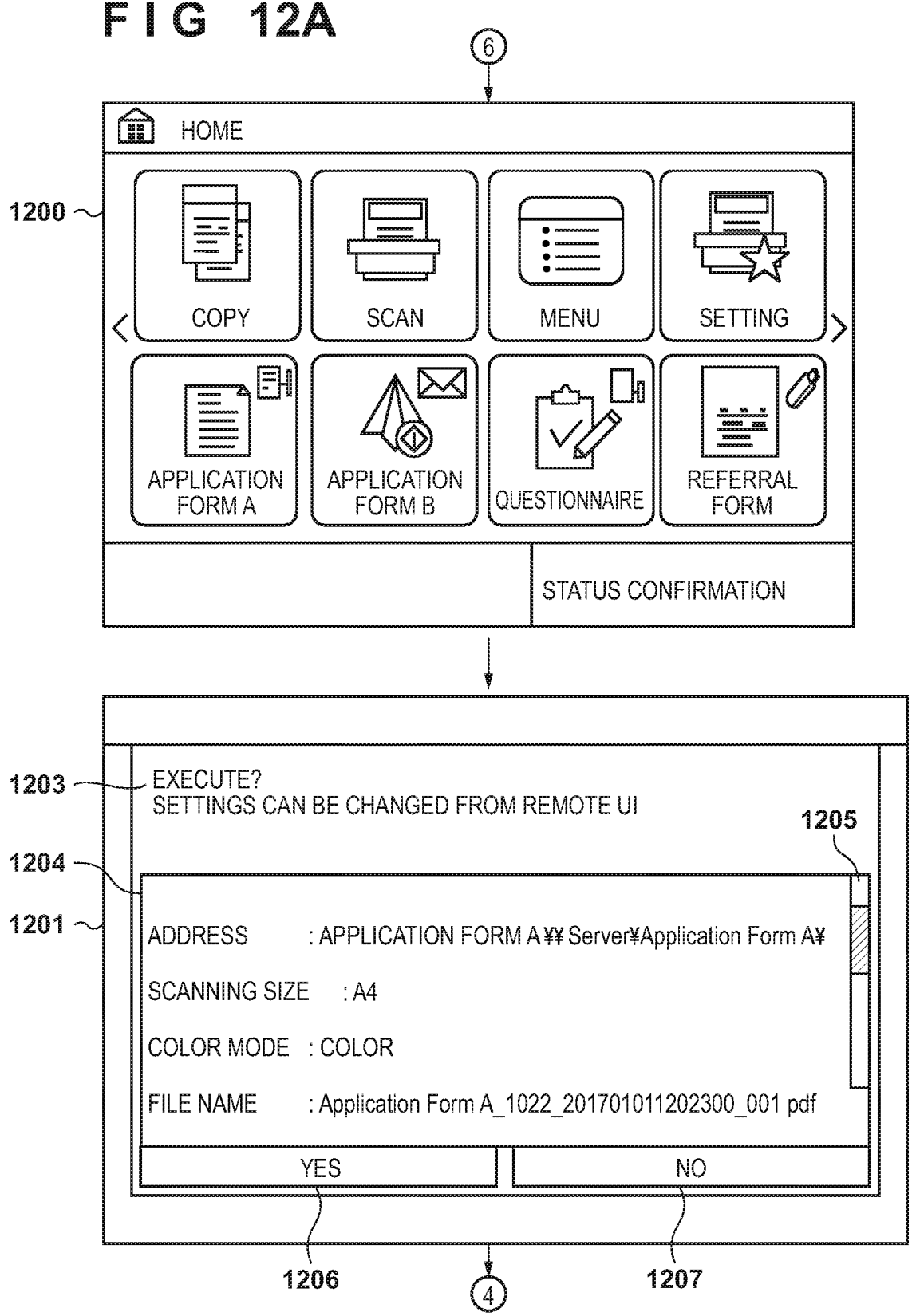
Figure 12C:
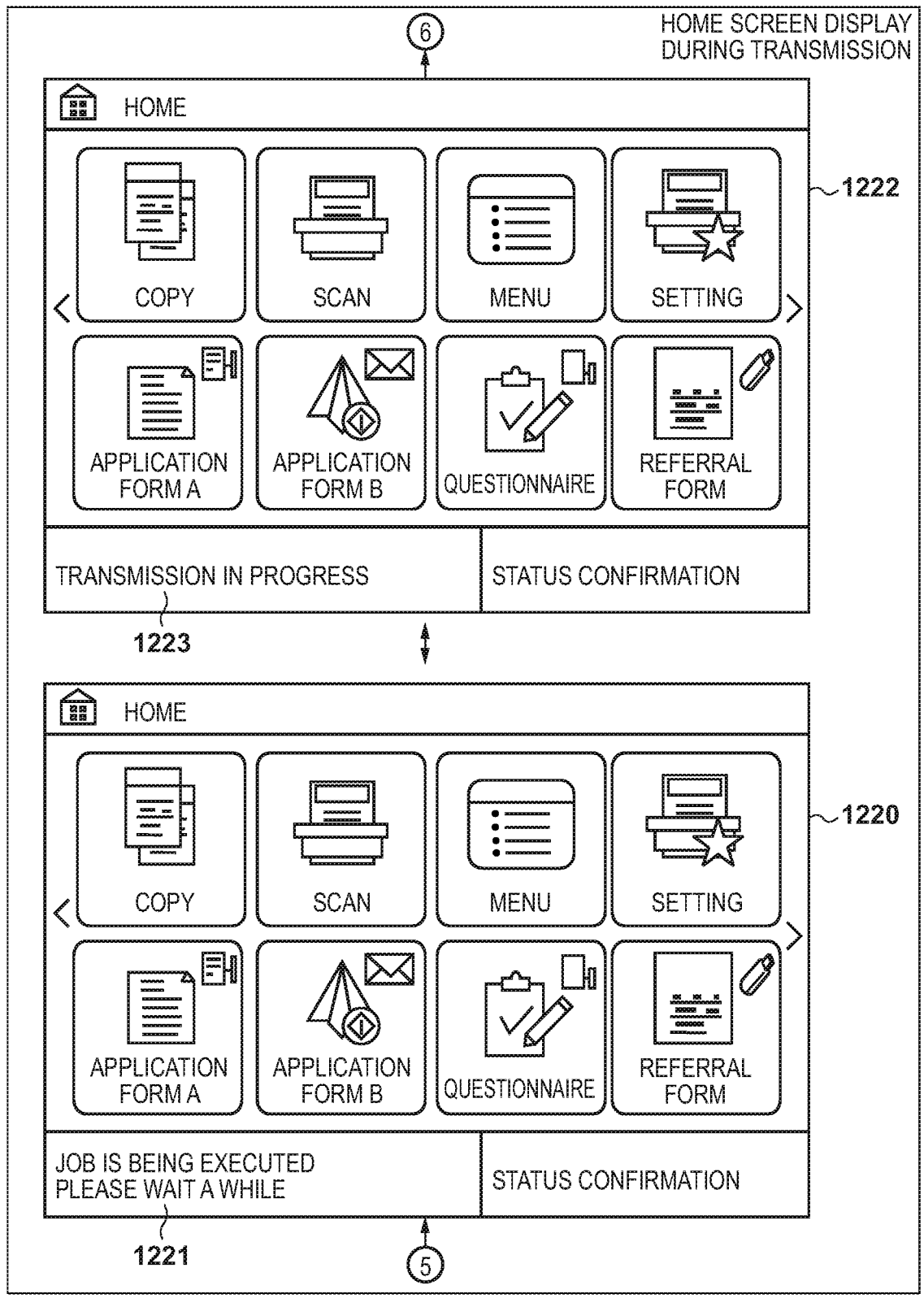

FIGS. 12A-12C depict views illustrating a flow for when a one-touch transmission button is pressed on the home screen displayed on the console unit 218 of the image forming apparatus 101 according to the embodiment. Note that this diagram is executed by the CPU 211 of the image forming apparatus 101 controlling the touch panel 300 of the console unit 218 via the console unit I/F 217.

On the home screen 1200, when a press of the application form A button 302 is detected, the button ID "1" of the one-touch transmission function at button arrangement 5 is read out from the home screen information in the storage 214. Next, the CPU 211 reads out the one-touch transmission button information shown in Table 2 from the storage 214 and reads out the button setting data (FIG. 5) of the button setting data "setting 1" from the button ID "1".

If the setting of the check box 4113 of FIG. 5 is ON, the display transitions to an execution confirmation screen 1201. If the setting of the check box 4113 is OFF, the execution confirmation screen 1201 is skipped and the display transitions to a scanning screen 1202.

The confirmation screen 1201 displays, in transmission setting information 1204, a confirmation message 1203 saying "Execute? Settings can be changed from remote UI", and the transmission settings 4109 set in FIG. 5, such as the destination, scanning size, color mode, and file name. Here, the file name to which the set button name "application form A" is added is set based on the file name setting 4103 of the button setting data. Regarding the file name, the automatically-generated file name is at the end of the button name, and the file name is automatically generated by connecting the reception number "1022", the transmission time (year, month, day, hour, minutes, seconds "20170101120230"), and the document number "0001" with dividing characters, which are underscores.

The transmission setting information 1204 can be displayed by scrolling to the file format, saturation, original document orientation, and the like, which are not shown in FIGS. 12A-12C, using a scroll bar 1205. When a "Yes" 1206 button, which is displayed on the confirmation screen 1201 is pressed, the display transitions to the scanning screen 1202, and the scanning of the original document placed on the reading unit 216 is started. On the other hand, if a "No" button 1207 is pressed, the display returns to the home screen 1200.

The scanning screen 1202 displays a scanning message 1208 saying "Scanning in progress", and scanning original document information 1209 such as the number of destinations and number of pages to transmit. While the scanning screen 1202 is being displayed, the image forming apparatus 101 scans the original document placed on the reading unit 216, generates image data, converts the image data into a file based on the transmission setting 4109 (FIG. 5), and stores the file in the RAM 213. The number of pages to be transmitted of the scanning original document information 1209 is incremented each time the number of pages of the scanned original document increases. The scanning original document information 1209 can also be displayed by scrolling to the setting information using a scroll bar 1210. The scanning screen 1202 further displays a cancel button 1211, a next scan button 1212, and a transmission start button 1213. When the cancel button 1211 is pressed, the scanning is canceled and the display returns to the home screen 1200. When the next scan button 1212 is pressed, the scanning of the next page of the original document is executed. When the transmission start button 1213 is pressed, the scanning ends, the converted file is transmitted to the destination in the transmission setting information, and the display transitions to a transmitting screen 1214.

The transmitting screen 1214 displays a transmitting message 1215 saying "Transmission in progress", and transmission information 1216 displaying the number of destinations and the number of pages to transmit. The transmission information 1216 can further display the job information being transmitted, with a scroll bar 1217. The transmitting screen 1214 further displays a cancel button 1218 and a close button 1219. When the cancel button 1213 is pressed, file transmission is canceled, the transmitted file is deleted, and termination by interruption is performed. When the close button 1219 is pressed, the transmitting screen 1214 is closed, and the display transitions to a home screen 1220.

The home screen 1220 displays a status display 1221 such as "Job execution in progress. Please wait a while." in the home screen display during file transmission. When a certain amount of time elapses while transmission is in progress, the display of the home screen 1220 transitions to a home screen 1222. The home screen 1222 is a second home screen display during file transmission and displays a status display 1223 saying "Transmission in progress". When a certain amount of time elapses while transmission is in progress, the screen 1222 transitions to the home screen 1220. When transmission ends, the home screens 1220 and 1222 during transmission cancel the display of the status line and return to the display of the home screen 1200.

Figure 13:
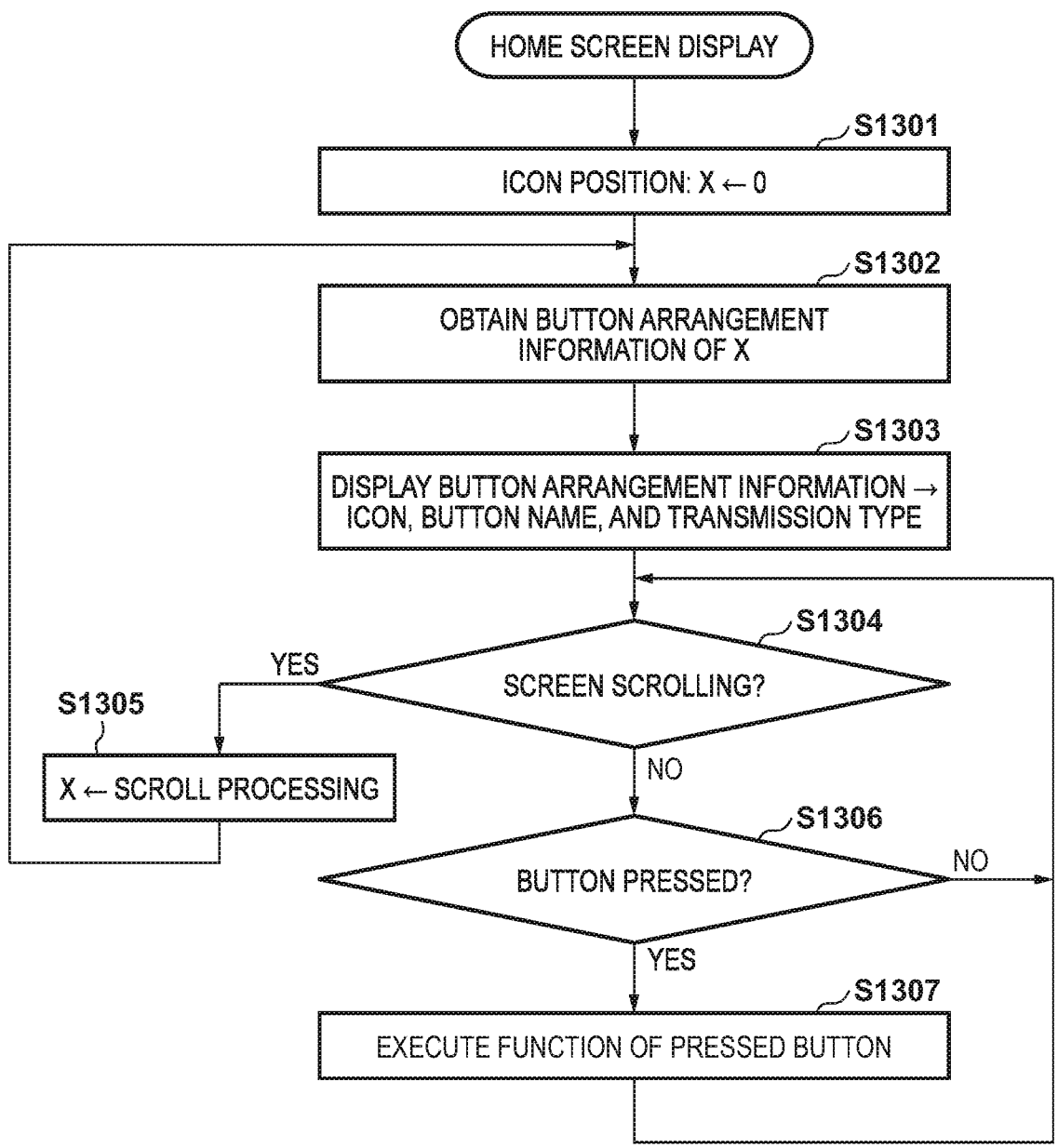
FIG. 13 is a flowchart for describing processing for when the image forming apparatus according to the embodiment displays the home screen and a button is pressed on the home screen.

FIG. 13 is a flowchart for describing processing for when the image forming apparatus 101 according to the embodiment displays a home screen shown in FIG. 3, for example, and a button is pressed on the home screen. Note that the processing shown in this flowchart is achieved by the CPU 211 executing a program deployed to the RAM 213.

First, in step S1301, the CPU 211 sets the icon position X indicating the position of the icon displayed on the home screen to "0". Next, the processing advances to step S1302, and the CPU 211 obtains the home screen information for button arrangements (X) to (X+8) from the storage 214 and holds the home screen information in the RAM 213. Next, the processing advances to step S1303, and the CPU 211 displays the icon images and the button names at icon positions (X) to (X+8) based on the information relating to the button names and icons that was obtained in step S1302. Note that if the function corresponding to the icon is one-touch transmission, the one-touch transmission button information 407 indicated in the button ID is further loaded and the one-touch transmission button is displayed based on the button name, icon, and transmission type information.

For example, according to the example shown in Table 1, the buttons are arranged at button arrangements 1 to 8, and the one-touch transmission buttons are arranged at arrangements 5 to 8. This corresponds to FIG. 3. In FIG. 3, the button names 333, 336, 338, and 341 corresponding to the buttons, the icons 332, 335, 337, and 340 corresponding to the icon information, and the icons 331, 334, and 339 corresponding to the transmission type information are displayed.

Next, the processing advances to step S1304, the CPU 211 detects whether or not a screen scroll operation has been performed with the console unit 218, and if a scroll operation has been performed, the processing advances to step S1305, and if a scroll operation has not been performed, the processing advances to step S1306. In step S1305, the CPU 211 sets the icon position X of the screen displayed after the screen scroll operation to the position after scrolling, and the processing advances to step S1302. In the embodiment, the value of (X+8) is set at the icon position X for the icon after rightward scrolling and the value of (X−8) is set at the icon position X for the icon after leftward scrolling.

In step S1306, the CPU 211 determines whether or not a button displayed on the home screen has been pressed, and if it is determined that a button has been pressed, the processing advances to step S1307, and if not, the processing returns to step S1304. In step S1307, the CPU 211 obtains the function information corresponding to the button based on the position of the pressed button, and executes the processing relating to the corresponding function. For example, if the scan button 301 at the button arrangement 2 has been pressed, the CPU executes processing relating to the scan function based on the home screen information in Table 1. For example, as described above with reference to FIGS. 11A-11C, the scan screen 1101 is displayed, and the image data obtained by scanning is transmitted or stored in the memory in accordance with the instruction given via the screen.

According to the embodiment as described above, due to the button names, icons indicating the content, and furthermore, the transmission types being displayed in the one-touch transmission buttons, the user can more clearly understand the information that is set in the one-touch transmission buttons. For example, since the application form A button 302 on the home screen in FIG. 3 includes the file transmission icon 331, the application form icon 332, and the button name "application form A" 333, the user can intuitively understand what kind of processing will be executed when the button is pressed.

Figure 14:
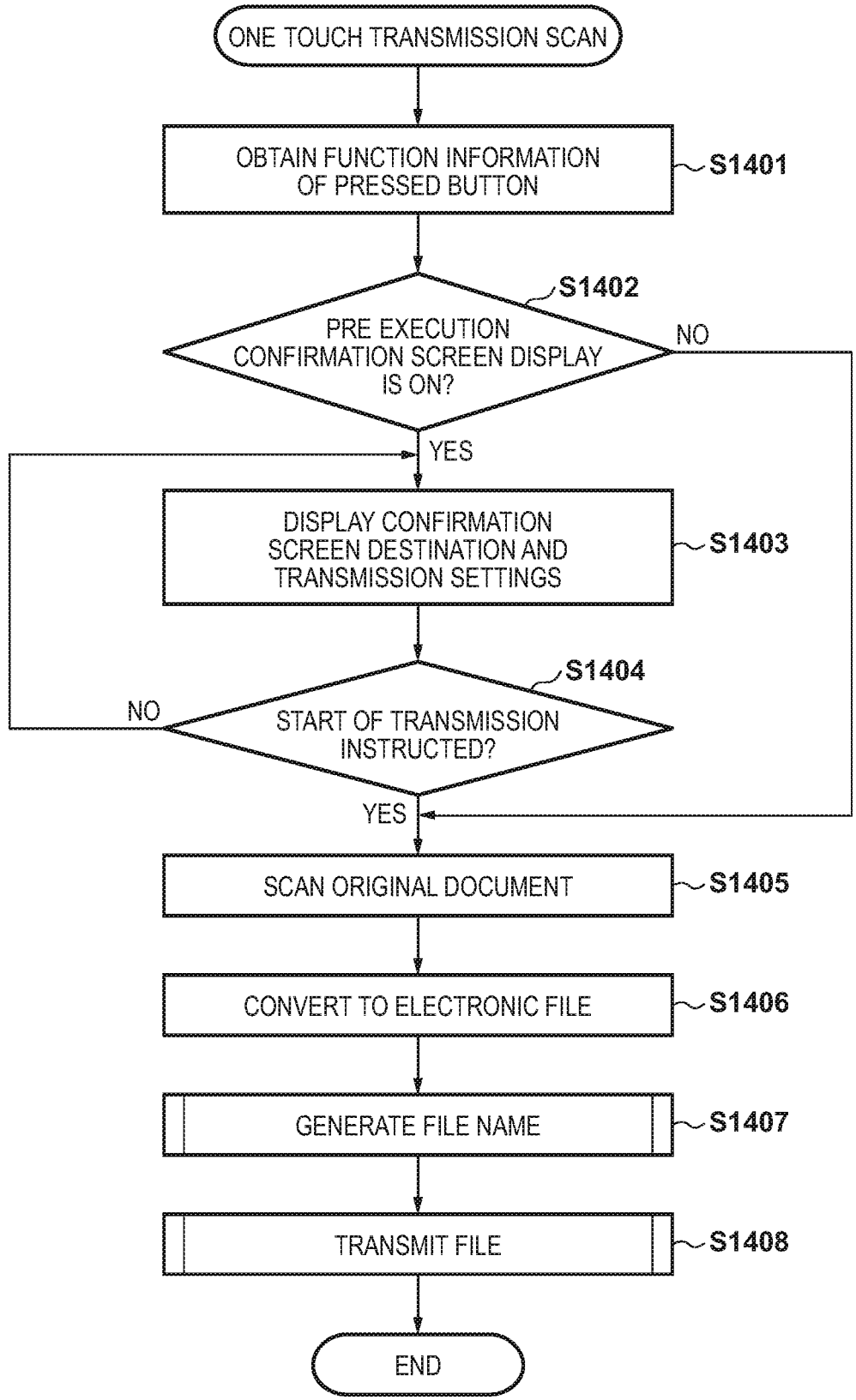
FIG. 14 is a flowchart for describing processing executed in step S1307 when a user presses the button for one-touch transmission in step S1306 of FIG. 13.
Figure 15:
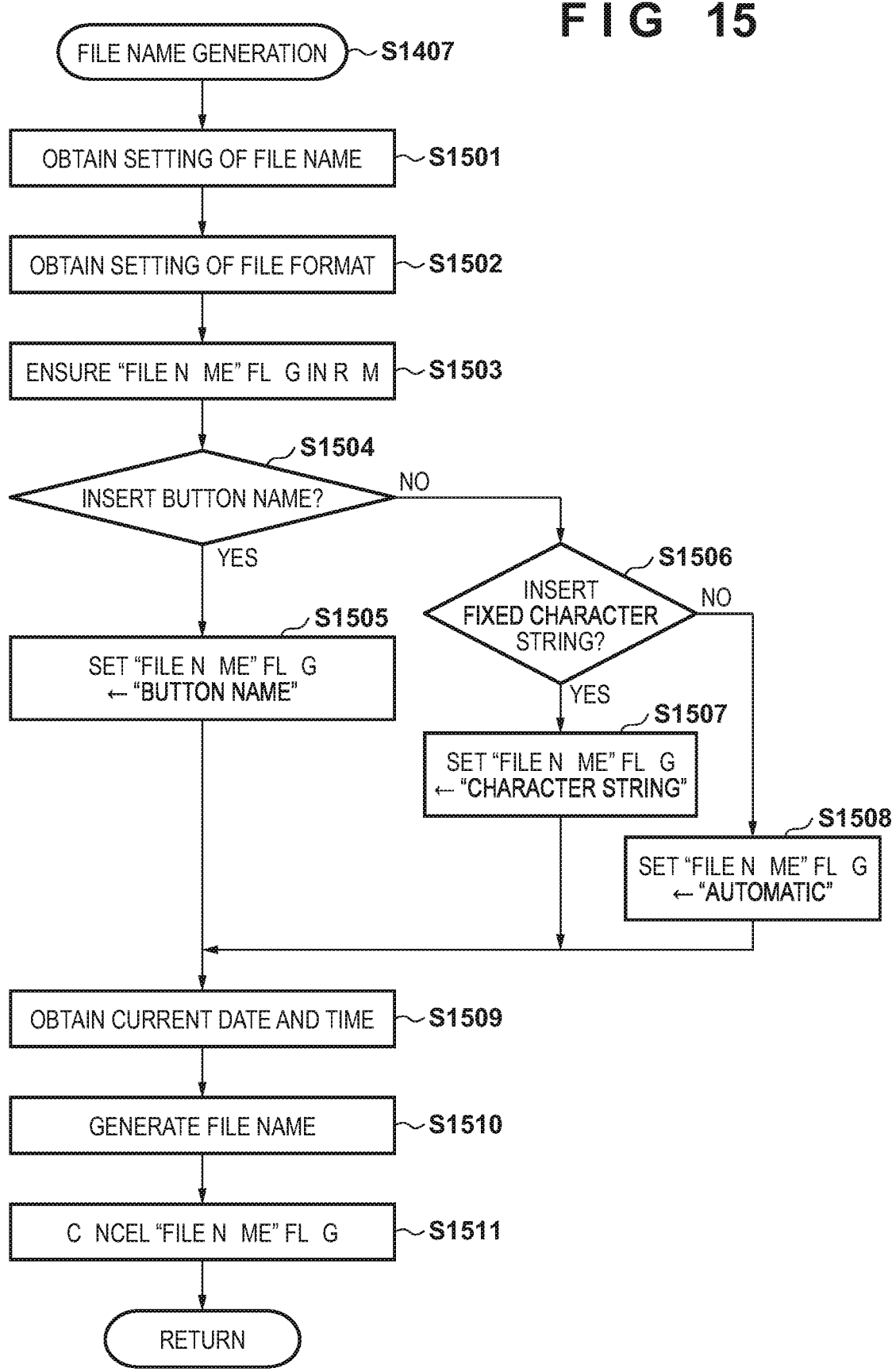
FIG. 15 is a flowchart for describing processing for generating a file name in step S1407 of FIG. 14.
Figure 16:
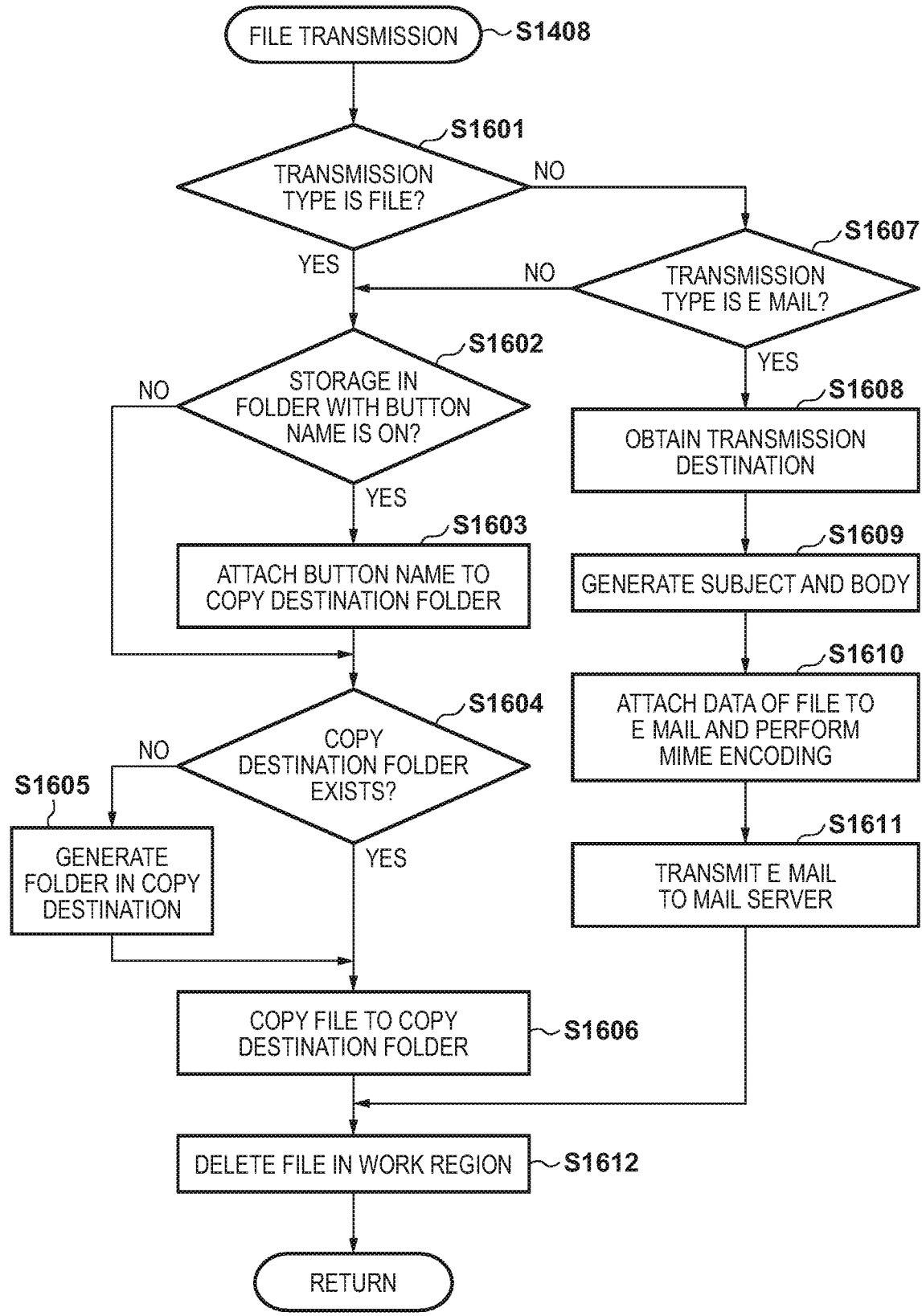
FIG. 16 is a flowchart for describing file transmission processing in step S1408 of FIG. 14.

FIGS. 14 to 16 are flowcharts for describing processing for realizing the LUI flow described with reference to FIG. 13. Note that the processing shown in these flowcharts is achieved by the CPU 211 executing a program deployed to the RAM 213.

FIG. 14 is a flowchart for describing processing executed in step S1307 when the user presses the button for one-touch transmission in step S1306 of FIG. 13.

In step S1401, the CPU 211 refers to the home screen information in Table 1 and obtains the one-touch transmission button information 407 (FIG. 4) of the function of the pressed button from the storage 214. Next, the processing advances to step S1402, the CPU 211 determines the setting of the confirmation screen display check box 4113 (FIG. 5) for the one-touch transmission button information, and determines whether or not the setting is ON, that is, whether or not "the confirmation screen is to be displayed before execution". Here, if the setting is ON, the processing transitions to step S1403, and if not, the processing advances to step S1405. In step S1403, the CPU 211 displays the pre-execution confirmation screen 1201 (FIG. 12A) on the touch panel 300 and the processing advances to step S1404.

In step S1404, the CPU 211 determines whether or not the "Yes" button 1206 on the confirmation screen 1201 has been pressed, and if the "Yes" button 1206 has been pressed, the processing advances to step S1405 in order to start transmission. On the other hand, if the "Yes" button 1206 has not been pressed, the processing returns to step S1403. Note that if the "No" button 1207 has been pressed here, the home screen is displayed on the touch panel 300.

In step S1405, the CPU 211 starts the scanning of the original document placed on the reading unit 216. Here, while the original document is being scanned, the scanning screen 1202 (FIG. 12B) is displayed on the touch panel 300, and for each page, the CPU 211 waits for a press of the next scan button 1212, and when the final page is scanned, the CPU 211 waits for a press of the transmission start button 1213. If the cancel button 1211 is pressed here, the home screen is displayed on the touch panel 300 (not shown in the drawing). When the transmission start button 1213 is pressed, the scanned image data is stored as image data in a work region prepared in the RAM 213. Then, the processing advances to step S1406, and the CPU 211 converts the image data obtained by scanning in step S1405 into a temporary electronic file based on the file format 4112 (FIG. 5) of the one-touch transmission button information 407 and stores the temporary electronic file in the work region prepared in the RAM 213.

Next, the processing advances to step S1407, and the CPU 211 generates a file name based on the one-touch transmission button information 407 of the button. The details of the processing for generating the file name will be described later with reference to the flowchart shown in FIG. 15. Next, the processing advances to step S1408, and the CPU 211 transmits the temporary electronic file stored in step S1406 with the file name decided on in step S1407. Note that if the transmission type is USB memory here, the temporary electronic file stored in step S1406 will be stored in the USB memory with the file name generated in step S1407. The details of the processing of step S1408 will be described later with reference to FIG. 16.

According to the embodiment as described above, compared with the standard flow for file transmission described with reference to FIGS. 11A-11C, the processing from the scanning of the original document to the transmission can be carried out by merely pressing the one-touch transmission button. Accordingly, the user can transmit (store) the image data of the original document as a digitized file by merely pressing the one-touch transmission button on the home screen. Also, at this time, generation of the file name and designation of the transmission destination (storage destination) are also carried out according to the content set in advance in correspondence with the button, and therefore the labor enacted by the user can be reduced.

FIG. 15 is a flowchart for describing processing for generating a file name in step S1407 of FIG. 14.

First, in step S1501, the CPU 211 obtains the file name setting 4103 (FIG. 5) from the one-touch transmission button information 407 obtained in step S1401. Next, the processing advances to step S1502, and the CPU 211 obtains the file format 4112 (FIG. 5). In the example shown in FIG. 5, PDF is set as the file format. Next, the processing advances to step S1503, and the CPU 211 allocates a "file name" flag in the RAM 213 in order to hold the setting of the file name.

Next, the processing advances to step S1504, and the CPU 211 determines whether or not the file name setting 4103 is set to have the "button name" inserted, and if so, the processing transitions to step S1505, and if not, the processing advances to step S1506. In step S1505, the CPU 211 sets the "button name" in the "file name" flag allocated in step S1503 in order to add the button name to the file name, and the processing advances to step S1509.

On the other hand, in step S1506, the CPU 211 determines whether or not the setting of the file name setting 4103 is "character string", and if so, the processing transitions to step S1507, and if not, the processing advances to step S1508. In step S1507, the CPU 211 sets "character string" in the "file name" flag in order to add the character string set in the edit box 4104, and the processing advances to step S1509. On the other hand, in step S1508, the CPU 211 sets "automatic" in the "file name" flag in order to generate the file name automatically, and the processing advances to step S1509.

In step S1509, the CPU 211 obtains the current date and time. The embodiment describes that Jun. 1, 2017, 12:00:00 is obtained. Next, the processing advances to step S1510, and the CPU 211 creates the file name to be transmitted. At this time, the file name is decided on based on the "file name" flag, the file format of the transmission setting 4109, and the current date and time. In step S1511, the "file name" flag allocated in the RAM 213 in step S1503 is released, and the processing ends.

In step S1510, if the "file name" flag is "automatic", for example, the file name "20170601120000.pdf" in which the current date and time are included is used. Also, if the "file name" flag is "button name", a file name in which the button name and the current date and time are included is used. For example, in the example shown in FIG. 5, the button name is "application form A", and therefore "application form A_20170601120000.pdf" is used. Furthermore, if the "file name" flag is "character string", the file name "ABC_20170601120000.pdf" is used in which the character string "ABC" input in the edit box 4104 and the current date and time are included.

Table 4 is a table showing examples of transmission file names (when the file format is pdf) decided on based on the file name flag.

TABLE 4

| File name flag | Transmission file name |
| --- | --- |
| Automatic | 2017060112000.pdf |
| Button name | Application form A_2017060112000.pdf |
| Character string "ABC" | ABC_2017060112000.pdf |

FIG. 16 is a flowchart for describing file transmission processing in step S1408 of FIG. 14.

First, in step S1601, the CPU 211 determines whether or not the setting of the transmission type 4107 (FIG. 5) is "file" according to the one-touch transmission button information 407 obtained in step S1401, and if it is "file", the processing transitions to step S1602, and if not, the processing transitions to step S1607. In step S1602, the CPU 211 determines whether or not the check box 4114 (FIG. 5) for "storage in folder with button name" is ON, and if so, the processing transitions to step S1603, and if it is OFF, the processing transitions to step S1604. In step S1603, the CPU 211 adds the button name to the copy destination folder information, and the processing advances to step S1604. In step S1604, the CPU 211 determines whether or not the copy destination folder is present, and if it is determined that the folder is present, the processing transitions to step S1606, and if it is determined that the folder is not present, the processing transitions to step S1605. In step S1605, the CPU 211 generates a folder in the copy destination based on the copy destination folder information, and the processing advances to step S1606. In step S1606, the CPU 211 outputs the electronic file generated in step S1406 to the transmission destination folder with the file name generated in step S1407, and the processing advances to step S1612.

On the other hand, if the setting of the transmission type 4107 (FIG. 5) is not "file", the processing advances to step S1607, and the CPU 211 determines whether or not the setting of the transmission type 4107 is "e-mail", and if it is e-mail, the processing transitions to step S1608, and if it is not e-mail, the processing transitions to step S1602. In the embodiment, the setting of the transmission type 4107 is file, e-mail, or USB memory, and therefore if step S1602 is transitioned to from step S1607, the transmission type 4107 is USB memory. In this case, the processing of steps S1602 to S1606 is executed with the file being copied not to the file server but to the USB memory.

In step S1608, the CPU 211 obtains the transmission destination of the transmission setting 4109 (FIG. 7) and sets the transmission destination to a destination for e-mail transmission. Next, the processing advances to step S1609, and the CPU 211 generates the character strings for the subject and body based on the edit boxes 4407 and 4408 (FIG. 7) and the check boxes 4409 and 4410 (FIG. 7). At this time, if the check box 4409 is ON, the subject is generated by adding the button name 4411 (FIG. 7) to the front of the character string in the edit box 4407.

For example, in the example shown in FIG. 7, the subject is "Application Form B; sending an attached file". If the check box 4409 is OFF, the subject is the character string "Sending an attached file" in the edit box 4407. If the check box 4410 is ON, the body is generated by adding the button name 4411 to the front of the edit box 4408. In the example shown in FIG. 7, the body is "Application Form B, a scanned document". Also, if the check box 4410 is OFF, the body is the character string "A scanned document" in the edit box 4408.

Next, the processing advances to step S1610, the CPU 211 attaches the electronic file generated in step S1406 to the e-mail, and converts the resulting e-mail into a MIME format (an e-mail format) as an e-mail to be attached to the e-mail generated in steps S1608 and S1609. Then, the processing advances to step S1611, and the CPU 211 performs SMTP transmission to transmit the e-mail generated in step S1610 to the mail server 103, and the processing advances to step S1612. In step S1612, the CPU 211 deletes the file from the work region being used as a temporary region for the electronic file, and the processing ends.

According to the embodiment as described above, when a file is to be transmitted, a file with a file name obtained by adding a button name thereto can be transmitted to a pre-designated destination by merely pressing the button for instructing transmission, without setting the file name. Accordingly, it is possible to perform transmission (storage) without performing an operation of setting the destination or file name as described with reference to FIGS. 11A-11C. Accordingly, the user can transmit (store) an image of an original document with a desired file name by merely pressing the one-touch transmission button corresponding to the type of original document to be scanned.

Note that although an example in which a button name is added to a file name was described in the embodiment, information that can be added as file information may be attached to a transmission folder, a title or keyword in a PDF in a transmission folder, a title or comment of a JPEG file, or the like.

Furthermore, the information to be attached as the button name is not limited to the one-touch transmission button, and all of the buttons that are pressed during file transmission may be added as file information. For example, if a transmission screen is transitioned to due to the press of a scan button shown in FIG. 11A, that information (the button name of the scan button, the server name, the address book name, etc.) can also be attached to the file information. Thus, by attaching the button name displayed on the screen to the file information, it is possible to automate the file sorting task using a tool based on the file information, and thus a more detailed sorting task and work flow can be provided.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-178047, filed Sep. 15, 2017, which is hereby incorporated by reference herein in its entirety.

What is claimed is:

1. An image processing apparatus, comprising:
a scanner that scans an image of a document and obtains image data;
a memory that stores a set of instructions; and
at least one processor that executes the instructions stored in the memory to:
register a name of an object;
cause a display to display the object;
receive an operation on the object by a user;
generate a file based on the image data obtained by the scanner;
set a file name of the file; and
perform, based on the operation on the object, a transmitting process for transmitting the file which has the set file name,
wherein the file name is able to be set by a first name setting method for setting the file name based on the name of the object,
wherein the file name is able to be set by a second name setting method for setting the file name based on a name received from the user separately from the name of the object,
wherein a plurality of objects including a first object and a second object are able to be registered,
wherein any one of at least the first name setting method and the second name setting method is able to be selected for the first object before a first operation on the first object is performed,
wherein any one of at least the first name setting method and the second name setting method is able to be selected for the second object before a second operation on the second object is performed, and
wherein different name setting methods from each other are able to be selected for the first object and the second object.

2. The image processing apparatus according to claim 1, wherein the at least one processor executes the instructions stored in the memory to:
cause the display to display the set file name for a respective object in accordance with having received the operation on the respective object.

3. The image processing apparatus according to claim 1, wherein the set file name further includes a character string which is determined based on time information.

4. The image processing apparatus according to claim 1, wherein the at least one processor registers a scan setting for the object, and
wherein the at least one processor causes, based on the operation on the object, the scanner to scan an image of a document based on the scanning setting registered for the object.

5. The image processing apparatus according to claim 1, wherein the at least one processor further registers a file format, and
wherein the at least one processor generates, based on the operation on the object, a file of the file format registered for the object.

6. The image processing apparatus according to claim 1, wherein the name of the object is received from an external apparatus via a network, and
the at least one processor registers the name of the object received from the external apparatus.

7. The image processing apparatus according to claim 1, wherein the at least one processor performs the transmitting process for transmitting the file by an SMB protocol.

8. The image processing apparatus according to claim 1, wherein the at least one processor performs the transmitting process for transmitting the file by an FTP protocol.

9. The image processing apparatus according to claim 1, wherein the at least one processor performs the transmitting process for transmitting the file by electronic mail.

10. The image processing apparatus according to claim 1, wherein the file name is able to be set by a third name setting method for setting the file name based on time information.

11. The image processing apparatus according to claim 10, wherein any one of at least the first name setting method, the second name setting method, and the third name setting method is able to be selected for the first object before the first operation on the first object is performed, and wherein any one of at least the first name setting method, the second name setting method, and the third name setting method is able to be selected for the second object before the second operation on the second object is performed.

12. A method of controlling an image processing apparatus having a scanner that scans an image of a document and obtains image data, the method comprising:
registering a name of an object;
causing a display to display the object;
receiving an operation on the object by a user;
generating a file based on the image data obtained by the scanner;
setting a file name of the file; and
performing, based on the operation on the object, a transmitting process for transmitting the file which has the file name,
wherein the file name is able to be set by a first name setting method for setting the file name based on the name of the object,
wherein the file name is able to be set by a second name setting method for setting the file name based on a name received separately from the name of the object from the user,
wherein a plurality of objects including a first object and a second object are able to be registered,
wherein any one of at least the first name setting method and the second name setting is able to be selected for the first object before a first operation on the first object is performed,
wherein any one of at least the first name setting method and the second name setting method is able to be selected for the second object before a second operation on the second object is performed, and
wherein different name setting methods from each other are able to be selected for the first object and the second object.

13. A non-transitory computer-readable storage medium storing a program for causing a computer to execute a method of controlling an image processing apparatus having a scanner that scans an image of a document and obtains image data, the method comprising:
registering a name of an object;
causing a display to display the object;
receiving an operation on the object by a user;
generating a file based on the image data obtained by the scanner;
setting a file name of the file; and
performing, based on the operation on the object, a transmitting process for transmitting the file which has the file name,
wherein the file name is able to be set by a first name setting method for setting the file name based on the name of the object,
wherein the file name is able to be set by a second name setting method for setting the file name based on a name input received separately from the name of the object from the user, and
wherein a plurality of objects including a first object and a second object are able to be registered,
wherein any one of at least the first name setting method and the second name setting is able to be selected for the first object before a first whether to set the file name based on the name of the object or to set the file name based on the name input separately from the name of the object is selectable by a user before the operation on the first object is performed,
wherein any one of at least the first name setting method and the second name setting method is able to be selected for the second object before a second operation on the second object is performed, and
wherein different name setting methods from each other are able to be selected for the first object and the second object.

14. An image processing apparatus comprising:
a scanner; and
a controller that performs processing based on an operation on one object that has been registered, wherein the processing is processing for causing the scanner to scan an original, converting image data obtained by scanning the original by the scanner to an electronic file, and transmitting the electronic file,
wherein, when registering the one object, the image processing apparatus sets, for the one object, at least, whether to set a file name of the electronic file based on a name of the one object, or to set the file name of the electronic file based on a predetermined name received separately from the name of the one object.

15. The image processing apparatus according to claim 14, wherein the name of the one object is received.

16. The image processing apparatus according to claim 14, wherein the controller is further able to set a scan setting of the original, and
wherein the controller performs the processing based on an operation on the one object that has been registered, the processing being a processing for causing the scanner to scan the original based on the scan setting, converting the image data obtained by scanning the original by the scanner to an electronic file, and transmitting the electronic file.

17. The image processing apparatus according to claim 14, wherein the controller is further able to set a destination for the original, and
wherein the controller performs the processing based on an operation on the one object that has been registered, the processing being a processing for causing the scanner to scan the original, converting the image data obtained by scanning the original by the scanner to an electronic file, and transmitting the electronic file to the destination set for the original.

18. The image processing apparatus according to claim 14, wherein the controller is further able to set a transmission type for the original, and
wherein the controller performs the processing in accordance with an operation on the registered one object, the processing being processing for causing the scanner to scan the original, converting the image data obtained by scanning the original by the scanner to an electronic file, and transmitting the electronic file based on the transmission type set for the original.

19. The image processing apparatus according to claim 18, wherein transmission type includes one of an electronic mail, an SMB protocol, and an FTP protocol.

20. The image processing apparatus according to claim 14, further comprising a display that displays the name of the one object together with the one object.

21. The image processing apparatus according to claim 14, further comprising:
a network interface that communicates with an external apparatus, wherein whether to set the file name of the electronic file based on the name of the one object or to set the file name of the electronic file based on the predetermined name is selected via the network interface from the external apparatus.

22. The image processing apparatus according to claim 14, wherein, in a case where the image processing apparatus receives the file name of the electronic file based on the name of the one object, a reception of the predetermined name is not performed.

23. The image processing apparatus according to claim 14, wherein whether to set the file name of the electronic file based on the name of the one object or to set the file name of the electronic file based on the predetermined name is selected via a pull-down menu.

24. The image processing apparatus according to claim 14, further comprising:
a network interface that communicates with an external apparatus,
wherein the predetermined name is received via the network interface from the external apparatus.

25. The image processing apparatus according to claim 15, further comprising:
a network interface that communicates with an external apparatus,
wherein the name of the one object is received via the network interface from the external apparatus.

26. A method of setting a name of an electronic file, the method comprising:
setting, when registering one object, for the one object, at least whether to set a file name of an electronic file based on a name of the one object, or to set the file name of the electronic file based on a predetermined name received separately from the name of the one object; and
performing processing in accordance with an operation on the registered one object, wherein the processing includes scanning an original, converting image data obtained by scanning the original to the electronic file, and transmitting the electronic file.

27. An image processing apparatus, comprising:
a scanner;
a display that displays an object associated with an option selected from among a plurality of options including a first option for setting a file name based on an object name of the object and a second option for setting the file name based on information different from the object name; and
a controller that causes, based on a reception of user operation on the displayed object, the scanner to scan a document, generates a file including image data generated by scanning the document and a file name determined based on a selection option from the plurality of options and performs transmission processing of the file.

28. The image processing apparatus according to claim 27, wherein a scan setting is further associated with the object, and
wherein the controller causes the scanner to scan the document based on the scan setting.

29. The image processing apparatus according to claim 27, wherein a destination is further associated with the object, and
wherein the controller causes the transmission processing of the file to the destination associated with the object.

30. The image processing apparatus according to claim 27, wherein a transmission type is further associated with the object, and
wherein the controller causes the transmission processing of the file based on the transmission type associated with the object.

31. The image processing apparatus according to claim 30, wherein transmission type includes one of an electronic mail, an SMB protocol, and an FTP protocol.

32. The image processing apparatus according to claim 27, further comprising a display that displays a name of the object together with the object.

33. The image processing apparatus according to claim 27, further comprising:
a network interface that communicates with an external apparatus,
wherein the option is selected from among the plurality of options via the network interface from the external apparatus.

34. An image processing apparatus, comprising:
a scanner;
a display that displays an object associated with an option selected from among a plurality of options including a first option for setting a file name based on an object name of the object and a second option for setting a file name based on a name that is able to be input separately from the object name; and
a controller that causes, based on a reception of user operation on the displayed object, the scanner to scan a document, generates a file including image data generated by scanning the document and a file name determined based on the selected option, and performs transmission processing of the file.

35. The image processing apparatus according to claim 34, wherein a scan setting is further associated with the object, and
wherein the controller causes the scanner to scan the document based on the scan setting.

36. The image processing apparatus according to claim 34, wherein a destination is further associated with the object,
wherein the controller causes the transmission processing of the file to the destination associated with the object.

37. The image processing apparatus according to claim 36, wherein a transmission type is further associated with the object, and
wherein the controller causes the transmission processing of the file based on the transmission type associated with the object.

38. The image processing apparatus according to claim 37, wherein transmission type includes ones of an electronic mail, an SMB protocol, and an FTP protocol.

39. The image processing apparatus according to claim 34, further comprising a display that displays a name of the object together with the object.

40. The image processing apparatus according to claim 34, further comprising:
a network interface that communicates with an external apparatus,
wherein an option is selected from among the plurality of options via the network interface from the external apparatus.

* * * * *